United States Patent [19]
Tozune et al.

[11] Patent Number: 5,805,552
[45] Date of Patent: Sep. 8, 1998

[54] DISC CARTRIDGE LOADING APPARATUS

[75] Inventors: Toshimasa Tozune, Saitama; Koichi Numata, Kanagawa, both of Japan

[73] Assignee: Sony Corporation, Tokyo, Japan

[21] Appl. No.: 707,581

[22] Filed: Sep. 5, 1996

Related U.S. Application Data

[60] Continuation of Ser. No. 350,315, Dec. 2, 1994, abandoned, which is a division of Ser. No. 64,552, May 19, 1993, abandoned.

[30] Foreign Application Priority Data

| May 22, 1992 | [JP] | Japan | 4-130252 |
| May 22, 1992 | [JP] | Japan | 4-130253 |
| May 22, 1992 | [JP] | Japan | 4-130254 |
| Oct. 6, 1992 | [JP] | Japan | 4-292138 |
| Oct. 8, 1992 | [JP] | Japan | 4-296455 |

[51] Int. Cl.$^6$ .................................. G11B 33/02
[52] U.S. Cl. .................................................. 369/75.2
[58] Field of Search ......................... 369/75.1–75.2, 369/77.1–77.2, 191–194, 178, 34, 36, 38, 244, 247, 249, 263; 360/99.02, 99.06

[56] References Cited

U.S. PATENT DOCUMENTS

| 4,562,498 | 12/1985 | Shibata | 360/97 |
| 4,641,211 | 2/1987 | Okita et al. | 360/99.06 |
| 4,707,819 | 11/1987 | Ehara | 360/99.06 |
| 4,723,185 | 2/1988 | Maeda | 369/77.2 |

(List continued on next page.)

FOREIGN PATENT DOCUMENTS

| 0 156 569 | 10/1985 | European Pat. Off. . |
| 0288126 | 10/1988 | European Pat. Off. . |
| 0 293 150 | 11/1988 | European Pat. Off. . |
| 3914303 | 10/1990 | European Pat. Off. . |
| 0 390 211 A3 | 9/1991 | European Pat. Off. . |
| 0 475 595 A2 | 3/1992 | European Pat. Off. . |
| 0 482 585 A2 | 4/1992 | European Pat. Off. . |
| 0 439 286 1 A3 | 1/1993 | European Pat. Off. . |
| 0583946 | 2/1994 | European Pat. Off. . |
| G11B17/022 | 10/1989 | Germany . |
| G11B33/08 | 9/1991 | Germany . |
| 59-5401 | 1/1984 | Japan | 369/247 |
| 217266 | 12/1984 | Japan . |
| 62-146478 | 6/1987 | Japan | 369/247 |
| 3-98745 | 10/1991 | Japan . |

OTHER PUBLICATIONS

Patent Abstracts of Japan vol. 16: No. 182 (P–1346) Apr. 30, 1992 & JP–A–04 021 946 Toshiba Corp. May 15, 1990.
Patent Abstracts of Japan vol. 14: No. 173 (P–1033) Apr. 5, 1990 & JP–A–02 027 551 (Nakamichi Corp.) Jan. 30, 1990.
Patent Abstracts of Japan vol. 14: No. 173 (P–1033) Apr. 15, 1990, & JP–A–02 027 552 (Nakamichi Corp.) Jan. 30, 1990.

*Primary Examiner*—Allen Cao
*Attorney, Agent, or Firm*—Limbach & Limbach L.L.P.

[57] ABSTRACT

A disc cartridge loading apparatus of simple construction smoothly and securely loads and unloads a disc cartridge. The disc cartridge loading apparatus includes a main slider supported so as to be freely slidable on a chassis. A cartridge holder is supported between side portions of the main slider so as to slidingly move in upward and downward directions. In addition, a loading slider is provided which is supported to be slidable to and from the cartridge holder. The loading slider includes a hook portion which engages a engaging portion provided in the side of a disc cartridge which is inserted into the cartridge holder. The loading apparatus is supported in a sub-chassis via damping members so as to prevent transmission of vibration from the sub-chassis to the loading apparatus. Further, during loading and unloading operation, engaging members are active to fix the positioning of the loading apparatus as a whole relative to the sub-chassis in the vertical, lateral and longitudinal directions so as to allow smooth and reliable loading and unloading of the disc cartridge.

10 Claims, 16 Drawing Sheets

U.S. PATENT DOCUMENTS

| | | | |
|---|---|---|---|
| 4,901,174 | 2/1990 | Saito et al. | 360/99.06 |
| 4,918,553 | 4/1990 | Suzuki et al. | 360/99.06 |
| 4,987,506 | 1/1991 | Uehara | 360/105 |
| 5,062,099 | 10/1991 | Odawara et al. | 369/263 |
| 5,067,121 | 11/1991 | Einhaus | 369/75.2 |
| 5,123,004 | 6/1992 | Arai | 369/75.2 |
| 5,142,522 | 8/1992 | Muramatsu et al. | 369/75.2 |
| 5,184,342 | 2/1993 | Ishii | 369/100 |
| 5,195,079 | 3/1993 | Inone et al. | 369/75.1 |
| 5,224,079 | 6/1993 | Inoue | 369/751.2 |
| 5,260,924 | 11/1993 | Hayashi | 369/71 |
| 5,297,117 | 3/1994 | Uzuki et al. | 369/75.2 |
| 5,309,421 | 5/1994 | Fujisawa | 369/77.1 |
| 5,384,757 | 1/1995 | Ohmori et al. | 369/75.2 |
| 5,481,423 | 1/1996 | Aoki | 369/75.2 |
| 5,513,054 | 4/1996 | Watanabe | 360/99.06 |

DISC CARTRIDGE LOADING APPARATUS

This is a continuation of application Ser. No. 08/350,315 filed on Dec. 2, 1994 now abandoned, which is a divisional of application Ser. No. 08/064,552 filed on May 19, 1993, now abandoned.

FIELD OF THE INVENTION

The present invention relates generally to a loading apparatus for disc cartridges. More particularly, the present invention relates to a loading apparatus which may load and unload a disc cartridge containing a magneto-optical disc, or the like.

BACKGROUND OF THE INVENTION

Numerous devices are known which utilize various types of disc cartridges. Recently, a format has been introduced which utilizes a small sized magneto-optical disc rotatably mounted in a cartridge casing. Such types of discs utilize a magneto-optical recording method which records a single bit by making a reverse magnetized area on a magnetic film having great coercive force and having a direction of magnetization which is perpendicular to the film face. The recorded bit is reverse magnetized by means of a laser beam or the like. In reproducing operation the recorded bit is reproduced via magneto-optical effect.

Generally, such disc cartridges have a casing consisting of upper and lower halves. For use the disc cartridge is loaded into a disc reproducing and/or recording apparatus via a loading apparatus effective for correctly positioning the disc cartridge relative to a magneto-optical pickup a magnetic head, etc.

Specifically, with reference to FIG. 1, a disc cartridge loading apparatus 100 includes a chassis 101 an ejecting plate 104 is mounted on two pairs of guide pins 102, 102 and 103, 103 which are projected at sides of the chassis 101, so as to be slidable in forward and rearward directions. Further, a cartridge holder 110 is mounted on two pairs of slanted cam grooves 104a, 104a which are formed on both sides of the ejecting plate 104. If the ejecting plate 104 moves forward toward the optical pickup 106 located in the middle of the chassis 101, where the disc cartridge is retained in the cartridge holder 110, the cartridge holder 110 moves downward and a chucking hub 202 located at a center portion of the magneto-optical disc 201 of the disc cartridge 200 is magnetically chucked on a turntable 107 and loading operation is complete. After completion of loading the ejecting plate 104 is locked by a lock lever 109 supported on the chassis 101 by a torsion coil spring 108, or the like.

On the upper face of the cartridge holder 110, a shutter opening and closing lever 11 for opening and closing a shutter 203 of the disc cartridge 200 and a misleading detection lever 112 are mounted, biased by a coil spring 113. In addition a plunger 116 is provided for swiveling upward and downward a support arm 115 which is mounted on a rear side 106a of the optical pickup 106. The support arm 115 mounts a magnetic head 114 at an end thereof. Further provided is a ejecting mechanism drive motor 117 which is operatively associated with the ejecting plate 104 via a series of reduction gears 118 and an ejection gear 119 which are set on the rear right side of the chassis 101. The drive motor 117 drives the ejecting plate 104 in the ejecting direction by forcibly moving it by pressing a rear edge 104b at a rear portion of the ejecting plate 104. When the ejecting plate 104 is moved on the chassis 101 by the drive motor 117 and the tensile force of a pair of coil springs 105, 105 set between the chassis 101 and the ejecting plate 104, the cartridge holder 104 slides upward to and to the front of the apparatus and the disc cartridge 200 held in the cartridge holder 110 is unloaded or ejected from the loading apparatus.

A construction similar to that described above is disclosed in Japanese Utility Model Application, Laid Open Publication No. 3-98745.

However, the above-described disc cartridge loading apparatus 100 has a disadvantage in that is needs a plurality of energizing means, such as the tension coil springs 105, 105, the torsion coil spring 108, a coil spring 113, etc., for energizing the ejecting plate 104, the lock lever 109 and the shutter opening and closing lever 111. Further, a plunger 116 is required for moving the support arm 115 and a drive motor 117 is also necessary. Thus, a large number of parts are required and the apparatus as a whole becomes heavy and large as well as high in cost.

Also, when such a conventional loading arrangement is mounted in a housing of a disc reproducing and/or recording apparatus it may be subjected to vibration which may cause misoperation of the loading apparatus, or positional dislodgement of the disc cartridge.

Thus, it has been required to provide a highly reliable loading apparatus for such a disc cartridge apparatus which utilizes a reduced number of parts so as to achieve smaller size and to reduce costs.

SUMMARY OF THE INVENTION

It is therefore an object of the present invention to provide a loading apparatus which resolves the above-mentioned problems.

It is a further object of the present invention to provide a disc cartridge loading apparatus which provides a highly reliable loading apparatus for a disc cartridge apparatus which utilizes a reduced number of parts and is smaller in size and lower in cost while providing smooth secure loading of a disc cartridge.

It is another object of the present invention to provide a disc cartridge loading apparatus supported such that vibration subjected to a disc play/record apparatus is not transmitted to the loading apparatus.

In order to accomplish the aforementioned and other objects, a disc cartridge loading apparatus is provided, including: a main slider supported so as to be freely slidable on a chassis, a cartridge holder which is supported so as to be freely moved upward and downward between side members of the main slider, the cartridge holder receiving a disc cartridge between side portions thereof, a loading slider which is supported so as to be freely slidable on the cartridge holder and having a hook portion on one side thereof engageable with an engaging groove provided on a corresponding side of the disc cartridge, a drive motor for selectively moving the disc cartridge inserted into the disc holder and engaged with the hook portion of the loading slider in one of a loading and unloading direction according to sliding movement of the loading slider, and a mechanism for raising and lowering the cartridge holder and the loading slider relative to the main slider according to sliding movement of the main slider.

According to another aspect of the present invention, a disc cartridge loading apparatus including optical and magnetic heads for reproducing and/or recording data on a magneto-optical disc is provided which includes a main slider supported so as to be freely slidable on a chassis, a cartridge holder which is supported so as to be freely moved upward and downward between side members of the main slider, the cartridge holder receiving a disc cartridge between side portions thereof, a loading slider which is supported so as to be freely slidable on the cartridge holder and having a hook portion on one side thereof engageable with an engaging groove provided on a corresponding side of the disc cartridge, a drive motor for selectively moving the disc cartridge inserted into the disc holder and engaged with the hook portion of the loading slider in one of a loading and unloading direction according to sliding movement of the loading slider, a mechanism raising and lowering the cartridge holder and the loading slider relative to the main slider according to sliding movement of the main slider, a rack arranged on an outer side of the main slider and a drive gear engaged to the rack and driven by the drive means, the loading slider being slid forward and backwards into and out of the cartridge holder via a drive gear drivingly connected with the drive means, whereby a disc cartridge engaged with the hook portion of the loading slider can be selectively drawn in and ejected from the loading apparatus, the cartridge holder and the loading slider being constructed so as to move vertically relative to the main slider by reciprocating sliding of the main slider forward and rearward via rotation of the drive gear, and a supporting arm mounting the magnetic head for recording data on the disc contained in the disc cartridge, the supporting arm being supported in a manner so as to be movable in a vertical direction with respect to the chassis via a cam engaged with a cam groove formed in the rack of the main slider.

Also, according to a further aspect of the invention, a disc cartridge loading apparatus is provided which includes an outer casing having a chassis mounted therein, a main slider supported so as to be freely slidable on the chassis, a cartridge holder which is supported so as to be freely moved upward and downward between side members of the main slider, the cartridge holder receiving a disc cartridge between side portions thereof, a loading slider which is supported so as to be freely slidable on the cartridge holder and having a hook portion on one side thereof engageable with an engaging groove provided on a corresponding side of the disc cartridge, drive means for selectively moving the disc cartridge inserted into the disc holder and engaged with the hook portion of the loading slider in one of a loading and unloading direction according to sliding movement of the loading slider, and means for raising and lowering the cartridge holder and the loading slider relative to the main slider according to sliding movement of the main slider, a plurality of damper mechanisms provided between the disc cartridge loading apparatus and the outer casing such that the loading apparatus is oscillatable in three dimensions relative the outer casing, and engaging members engageable with corresponding engaging members on the outer casing so as to positionally fix the disc cartridge loading apparatus in the three dimensions during upward movement of the cartridge holder.

DESCRIPTION OF THE PREFERRED EMBODIMENT

Figure 2:
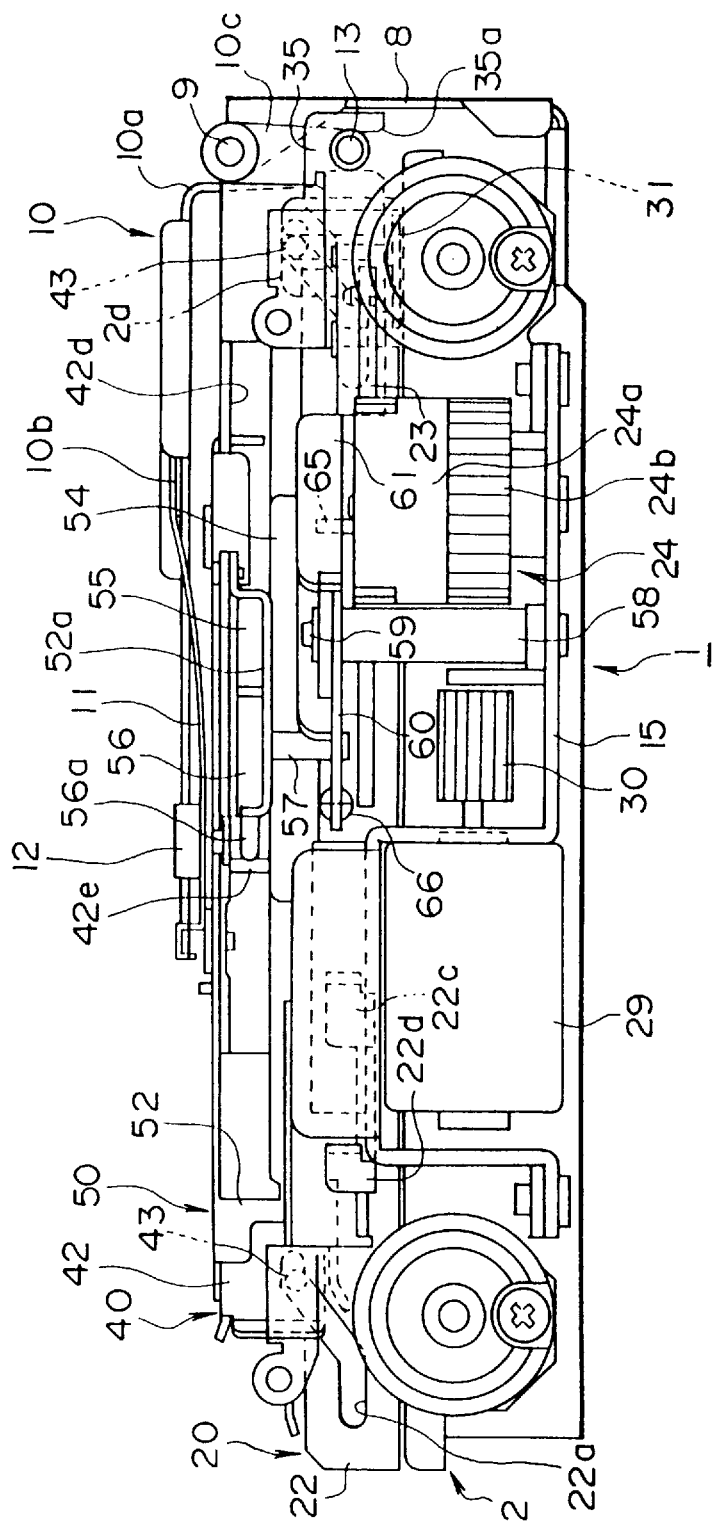
FIG. 2 is a side view of the disc cartridge loading apparatus of FIG. 1.
Figure 3:
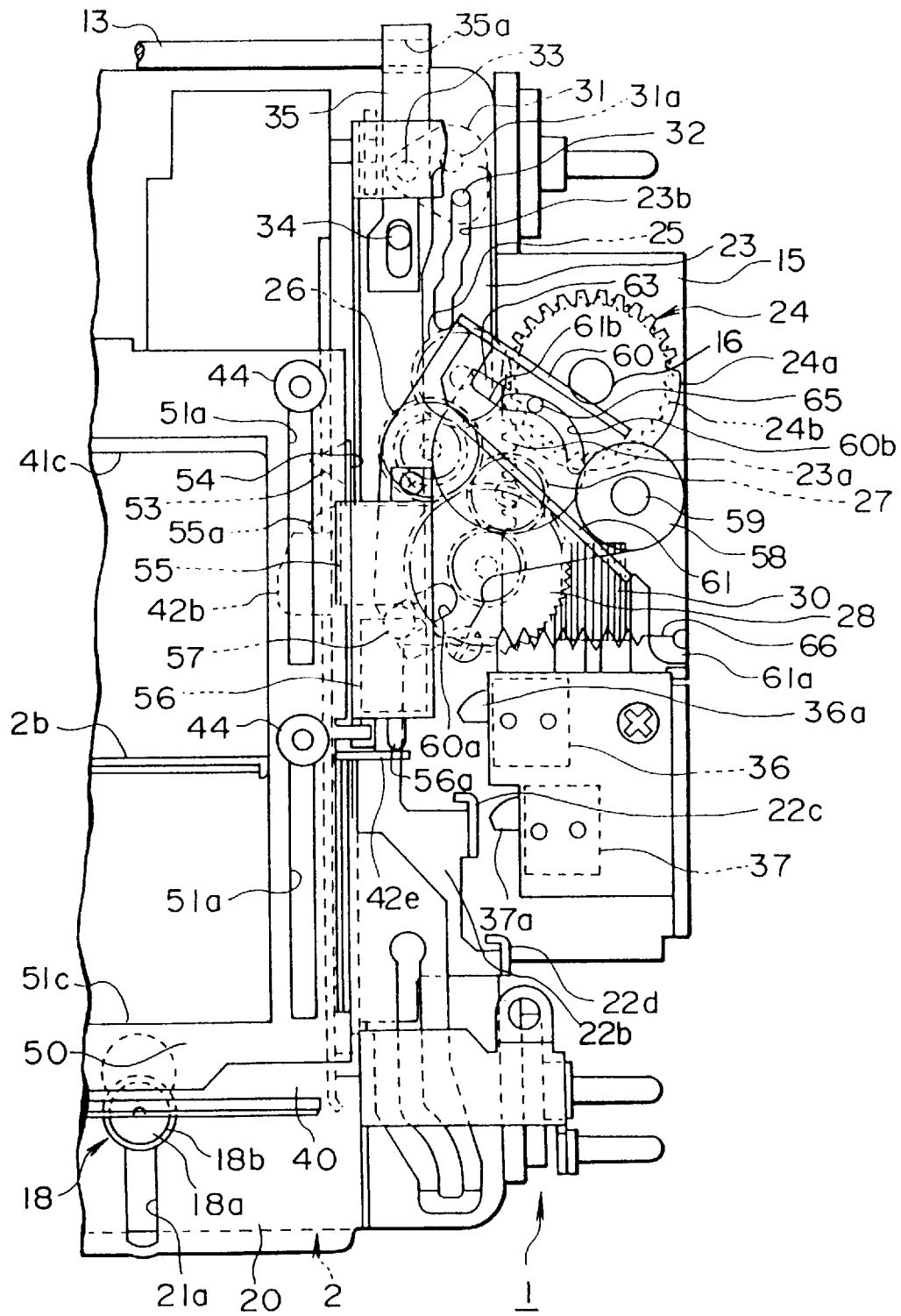
FIG. 3 is a partial plan view of the disc cartridge loading apparatus of the first embodiment in an initial position thereof.
Figure 4:
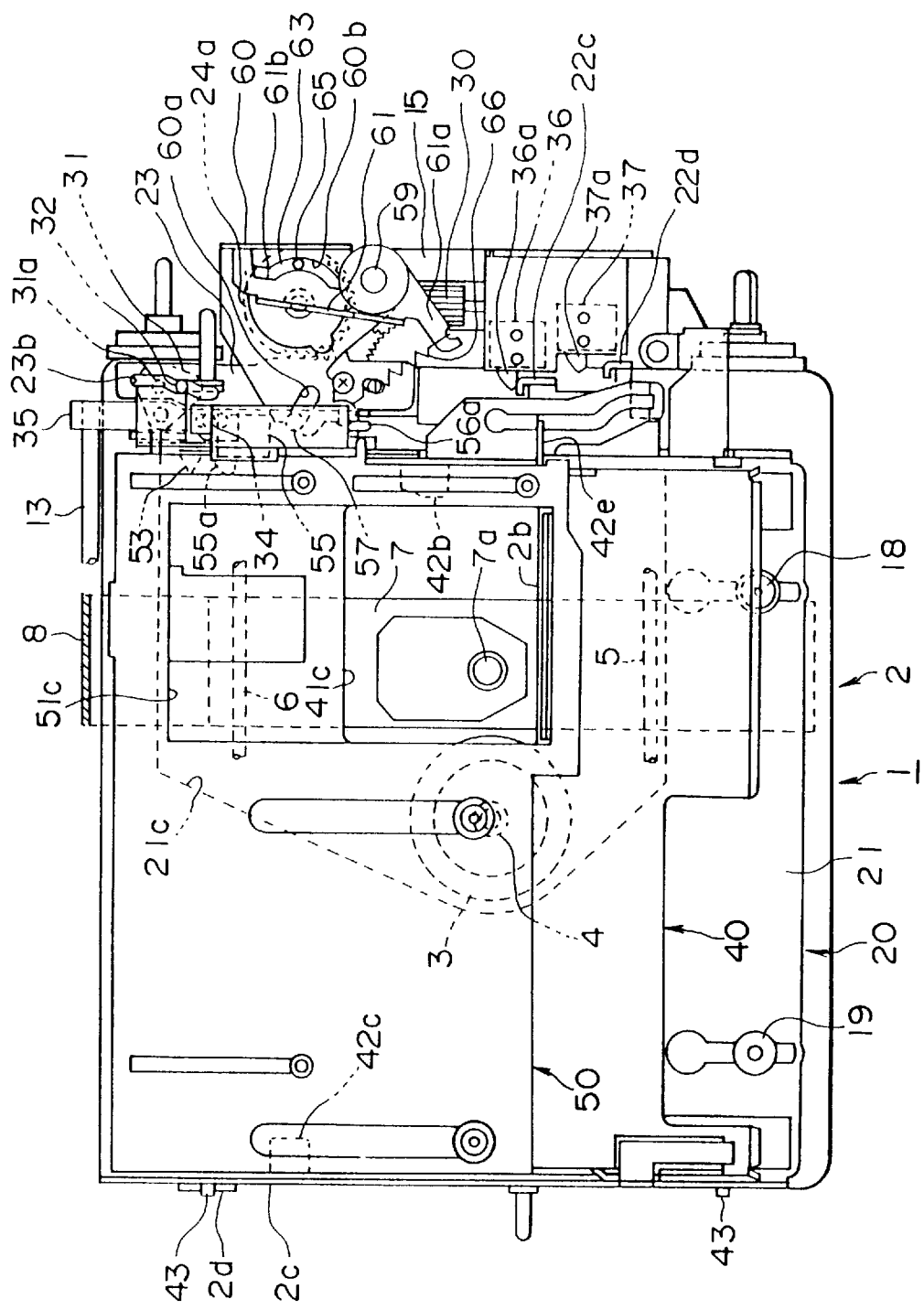
FIG. 4 is a plan view of the loading apparatus of the first embodiment in a play enable position thereof.

Referring now to the drawings, particularly to FIGS. 1 to 5, a disc cartridge loading apparatus 1 according to a first embodiment of the invention receives a small size disc cartridge 70 rotatably mounting therein a magneto-optical disc 71 which may be slidably loaded and unloaded (ejected) from the loading apparatus 1. The loading apparatus 1 includes a sheet metal chassis 2 having a turntable 3 provided at a substantially center location thereof. The turntable 3 is rotatably connected to an output shaft 4 of a motor (not shown). To the right in FIG. 1, a right side portion 2a of the chassis 2 having a cut-out 2b (see FIG. 3) formed therein is provided. The cut out 2b extends from a middle area of the chassis 2 to the right side portion 2a thereof. Referring to FIG. 4, opposing the cut out 2b at the lower side of the chassis 2 a slide guide shaft 5 is provided. An optical pickup 7 is disposed under the chassis 2 facing the cut out 2b mounted by way of the slide guide shaft 5 and a receiving screw 6 so as to be movable in the radial direction of the turntable so as to enable reading and/or writing of the optical disc 71.

Referring to FIG. 4, directions of movement used to describe operation of the invention are forward (to the right in FIG. 4) and rearward (to the left in FIG. 4). In addition, the upper direction of FIG. 4 is referred to as the right side of the loading apparatus while the lower direction of FIG. 4 is referred to as the left side. Also, upward and downward directions refer to vertical movement of portions of the apparatus.

Figure 1:
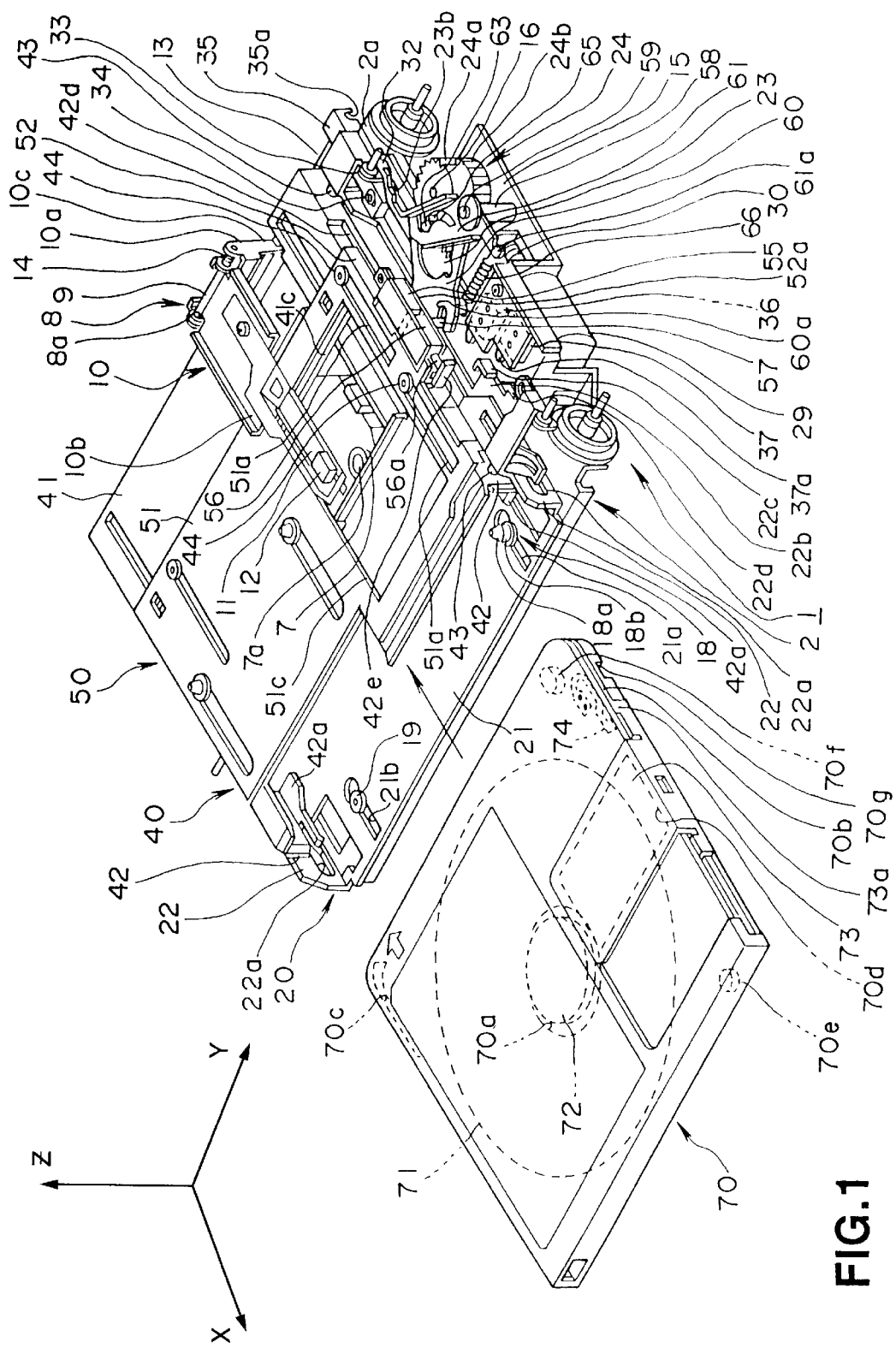
FIG. 1 is a perspective view of a disc cartridge and a cartridge loading apparatus therefor according to a first embodiment of the invention.

As may be seen in FIGS. 1 and 2, a rear lower surface portion of the optical pickup 7 is attached to a substantially L-shaped support plate 8. The support plate 8 is formed with opposing holes 8*a*, 8*a* in an upper side surface thereof for mounting the support plate 8 via an shaft member 9 to an upright portion 10*a* of an L-shaped support arm 10 so as to be movable in upward and downward directions. A gimbal 11 is projected from an edge portion 10*b* of the support arm 10 so as to be positioned over the cut-out 2*b* and mounts at an end thereof a magnetic head 12 such that an object lens 7*a* of the optical pickup 7 is interposed between the magnetic head 12 and the optical pickup 7. Further a lower edge portion 10*c* of the support arm 10 is mounted on an axis member 13 such that the support arm 10 is held above the right side portion 2*a* of the chassis 2. Further, the upright portion 10*a* of the support arm 10 is mounted to the shaft member 9 such that an edge portion 10*b* of the support arm 10 is always biased in the upward direction via a coil spring 14.

In addition, as seen in FIG. 1, a pair of first guide pins 18, 18, aligned in forward and rearward directions and in parallel with each other are projected from the right side of the chassis 2 proximate the right side portion 2*a* and, second guide pins 19, 19 also aligned in parallel to forward and rearward sides, are projected from the chassis 2 at a left side 2*c* thereof. Each of the first guide pins 18, include an inverted conical head portion 18a and a cylindrical shaft portion 18*b* and serve as positioning pins to determine a fully loaded position of the disc cartridge 70. One the other hand, each of the second guide pins 19 has a substantially flat upper portion and a generally T-shaped configuration. Slidably disposed above the chassis 2 via the first and second guide pins 18, 18 and 19, 19, a main slider 20 is disposed. The first and second guide pins 18, 18 and 19, 19 engage elongate openings 21*a* and 21*b* of the main slider 20 respectively such that the main slider 20 is movable in forward and rearward directions by a predetermined distance (i.e. 7 mm).

The main slider 20 is generally U-shaped and comprises a lower plate portion 21 and side portions 22, 22. Further, the lower plate portion 21 has a generally rectangular cut out 21*c* formed therein at a position opposing the cut out portion 2*b* of the chassis 2. Each of the opposing side portions 22, 22 of the main slider 20 have a cam groove 22*a* formed therein respectively.

The right side 22 of the main slider 20 has a flat side member 22*b* integrally formed therewith by bending processing or the like. The flat side member 22*b* mounts a rack 23 thereon which is attached by a screw, for example. The flat side member 22*b* further includes corner portions 22*c* and 22*d* which are integrally formed therewith by bending processing.

Figure 5:
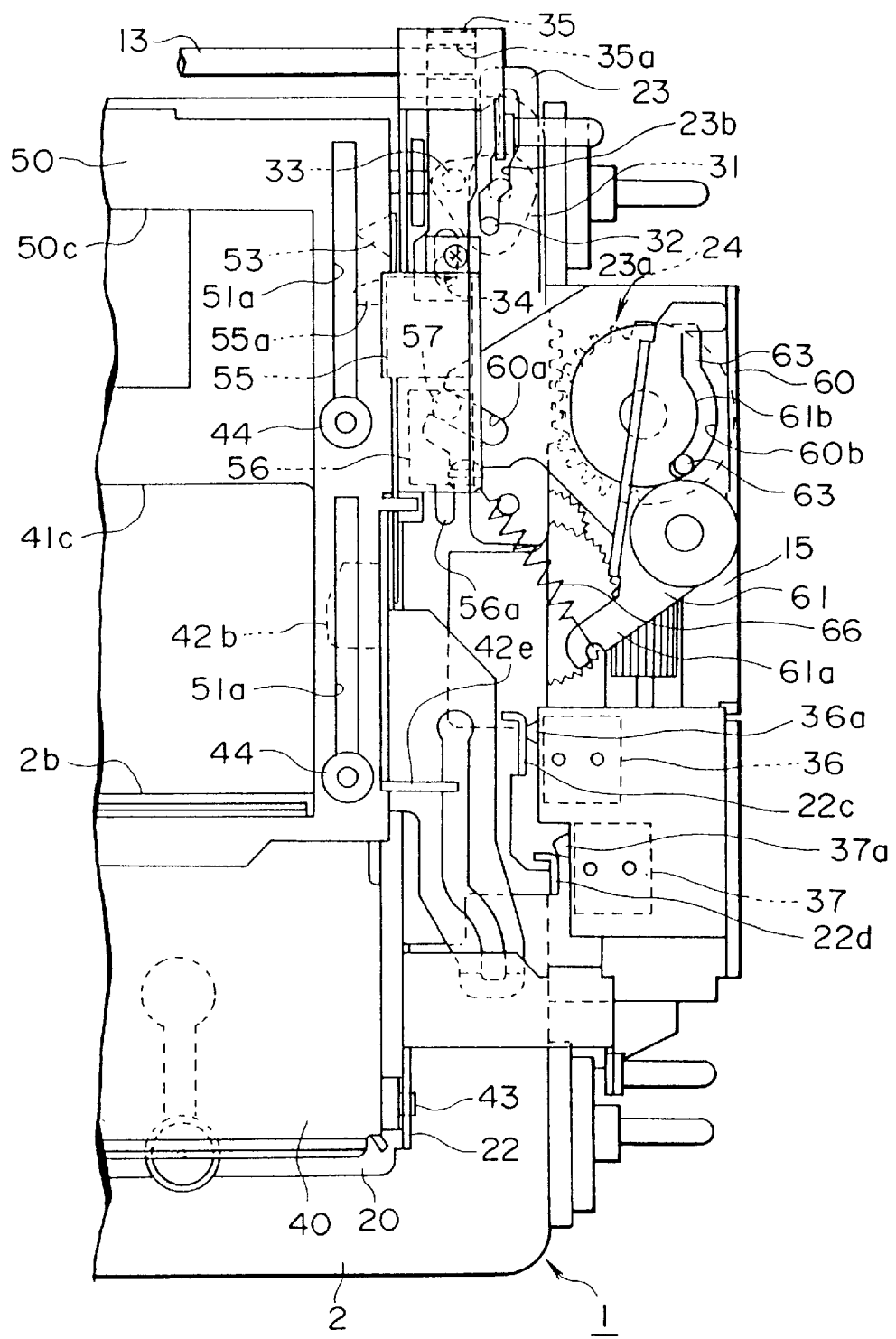
FIG. 5 is an partial plan view of the loading apparatus of FIG. 4 in a record enable position thereof.

As seen in FIG. 5, along the outer side of the rack 23, teeth portions 23*a* . . . are formed, the teeth 23*a* engage with a drive gear 24. The drive gear 24 includes a partially toothed upper gear portion 24*a* and a fully toothed lower gear portion 24*b*. The drive gear 24 is rotatably supported on an shaft 16 which is projected from a sub-chassis 15. The sub-chassis 15 being attached to the right side portion 2*a* of the chassis 2 by screws, for example.

The lower gear portion 24*b* of the drive gear 24 is engaged with a worm gear 30 of a loading motor 29 mounted on the sub-chassis 15 via a series of speed reduction gears 25 to 28. According to forward or reverse rotational output of the loading motor 29 the main slider 20 is driven in forward or rearward directions relative the chassis 2.

Figure 6:
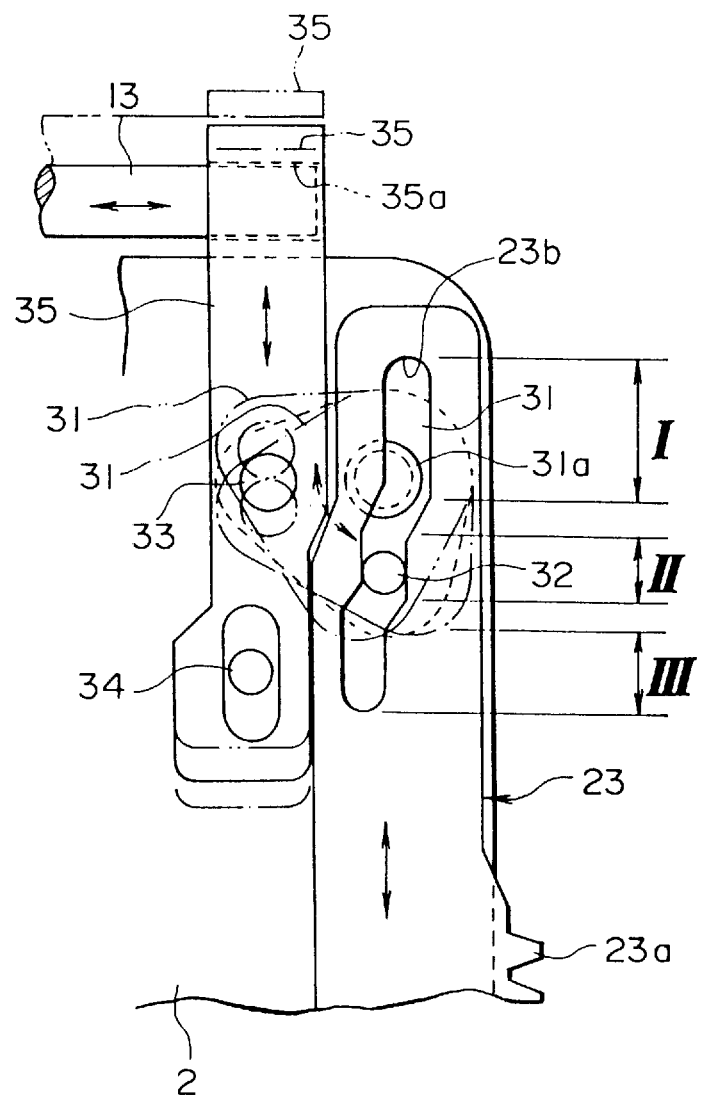
FIG. 6 is an enlarged plan view of a swing plate portion of the loading apparatus of the first embodiment showing a position of the swing plate according to a selected function of the disc cartridge loading apparatus.

Referring now the FIG. 6, numerals I, II and III represent respective portions along the length of a cam groove 23*b* of the rack 23. The cam groove 23*b* receives a cam pin 32 of a triangular cam 31 which is provided below the rack 23, mounted to an upper surface of the chassis 2 by a pivot pin 31*a*. A pin 33 is projected from a top portion of the main slider 20, the pin 33 is adjacent a stationary pin 34 of the chassis 2 and is slidable in forward and rearward direction in conjunction with a slide plate 35. The slide plate 35 is formed with a concave portion 35*a* on a lower side thereof. The concave portion 35*a* supports the slide plate 35 of the axis member 13 which also pivotally supports the upright portion 10*c* of the support arm 10 as described above. According to sliding and return movement of the main slider 20 in the forward and rearward directions, the rack 23 is also moved in forward in rear directions which in turn affects a height of the edge portion 10*b* of the support arm 10 which is driven to three different elevations. That is, referring to FIG. 6, when the cam pin 32 of the cam 31 is engaged at the I section of the cam groove 23*b* of the rack 23, the elevation of the support arm is such that the magnetic head mounted thereon assumes a position separate from the lens 7*a* of the optical pickup 7 (i.e. standby position). When the cam pin 32 of the cam 31 is in the II section of the cam groove 23*b* of the rack 23, the elevation of the support arm 10 is effected such that the magnetic head 12 is positioned adjacent the lens 7*a* of the optical pickup 7 (play position) and, when the cam pin 32 of the cam 31 is in the III section of the cam groove 23*b* of the rack 23, the elevation of the support arm 10 is effected such that the magnetic head 12 is positioned closely adjacent the lens 7*a* of the optical pickup 7 (record position). In the play position, as seen in FIG. 4, a lever 36*a* of a first position determining switch 36 mounted on the sub-chassis 15 contacts the corner portion 22*c* of the flat side member 22*b* of the main slider 20 so as to detect the position thereof. In the record position, as seen in FIG. 5, a lever 37*a* of a second position determining switch 37 contacts the other corner portion 22*d* of the flat side member 22*b* so as to detect that the record position has been established.

Between the side portions 22, 22 of the main slider 20, a cartridge holder 40 for retaining the disc cartridge 70 is supported so as to be movable in upward and downward directions. The cartridge holder 40 comprises a plate member 41 having side members 42, 42 integrally formed therewith such that the cartridge holder has an inverted U-shape configuration.

The plate member 41 of the cartridge holder 40 has a rectangular cut-out 41*c* formed therein so as to oppose the cut-out 2*b* of the chassis 2. Referring to FIG. 4, each of the side members 42, 42 of the cartridge holder 40 has forward and rear engagement pins 43, 43 projecting outwardly therefrom such that the forward pins 43 engage the cam grooves 22*a*, 22*a* of the side portions 22, 22 of the main slider 20 and the rear pins 43 engage concave portions 2*d* formed at rearward portions of the right side portion 2*a* and the left side 2*c* of the chassis 2. In addition, projecting inwardly from lower sides of the side members 42, 42 of the cartridge holder 40, cartridge support tabs 42*a*, 42*a* are respectively provided. Moreover at a central inner portion of the right side member 42 and a rear inner portion of the left side member 42 of the cartridge holder 40, respective projection portions 42*b* and 42*c* are formed for engaging corresponding cartridge guide grooves 70*b* and 70*c* formed respectively on right and left sides of the disc cartridge 70. Further, at an upper side of the right side portion 42 of the cartridge holder 40, an elongate groove 42*d* is formed and, at a position forward of the elongate groove 42*d*, an outwardly extending projection 42*e* is formed integrally with the right side member 42 by bending processing or the like.

The upper surface of the plate member 41 has a pair of guide pins 44, 44 projected therefrom at forward and rearward locations on either side of the position the disc cartridge 70 relative to the optical pickup 7.

Referring to FIGS. 1 and 4, a loading slider, for eject operations and the like, is slidably mounted over the cartridge holder 40. The loading slider 50 may be made of sheet metal, for example, and comprises a horizontal plate portion 51 and a downwardly projecting side portion 52 formed integrally therewith by bending processing or the like, thus giving the loading slider a substantially L-shaped configuration. The plate portion 51 of the loading slider is provided with guide grooves 51a, 51a extending in a front to rear orientation of the plate portion 51. The guide grooves 51a, 51a are engaged by the guide pins 44, 44 of the cartridge holder 40 so as to be slidably movable relative thereto. The plate portion 51 further has a rectangular cut-out 51c formed at a location so as to oppose the cut-out 41c of the cartridge holder.

At a lower side of the side portion 52 of the loading slider 50, an inwardly projecting triangular hook portion 53 is provided which is biased by a plate spring 54 so as to engage an engaging portion 70g of the disc cartridge 70. Also, at a lower side of the side portion 52, at a substantially central portion thereof, a horizontal projecting portion 52a is formed. At a rear side of the projecting portion 52a, a disc insertion completion detecting switch 55 is installed and, on a forward side of the projecting portion 52a, a disc ejection completion detecting switch 56 is provided. The insertion completion detecting switch 55 has an actuating lever 55a projected therefrom so as to be inserted into the elongate groove 42d of the side member 42 of the cartridge holder 40. The ejection completion detecting switch 56 includes an actuating lever 56a projected in a forward direction so as to contactable with the projection 42e of the side member 42 of the cartridge holder 40.

Further, referring to FIGS. 3–5, the projecting portion 52a has a pin 57 projecting vertically downward from a lower center portion thereof and is fixed by caulking or the like. The pin 57 stands on the sub-chassis 15 so as to engage a concave portion 60a of a first oscillating plate 60 mounted on an axis 59 of a support brace 58. The first oscillating plate 60 has an arc-shaped cam groove 60b formed at a side facing the drive gear 24. Also, a second oscillating plate 61 is mounted on an upper side of the first oscillating plate 60 commonly on the axis 59 so as to be freely pivotable thereon. The second oscillating plate 61 has a cam groove opening 63 having a cam surface 61b formed therein at the side of the drive gear and the above-mentioned cam groove 60b of the first oscillating plate 60. A drive pin 65, eccentrically projected from the top of the drive gear 24 is inserted into the cam groove opening 63 of the second oscillating plate 61 such that according to rotation of the drive gear 24, the loading slider 50 may be urged to slide backwards or forwards relative to the cartridge holder by a predetermined distance (i.e. 16.5 mm). Furthermore, a coil spring 66 is arranged between the first oscillating plate 60 and an end portion 61a of the second oscillating plate 61.

Hereinbelow, the structure of the disc cartridge 70 according to the invention will be described in detail with reference to FIG. 1.

As described above and as may be seen in FIG. 1, the disc cartridge 70 is has a space between upper and lower halves thereof in which a small size (i.e. 65 mm) magneto-optical disc 71 is rotatably disposed. The magneto-optical disc 71 has a chucking hub 72 provided at a center portion thereof. The lower side of the chucking hub 72 is accessible through a chucking opening 70a provided on the lower side of the disc cartridge 70. Further, a long guide groove 70b is formed on one side of the disc cartridge 70 in the longitudinal directions thereof and a short guide groove 70c is formed on the opposite side. The side having the long guide groove 70b further has an opening 70d formed through both upper and lower haves of the disc cartridge 70 for allowing access to the magneto-optical disc 71 for reading and writing thereof. The opening 70d is covered by a slidably disposed shutter 73 having a reverse C-shape configuration. Furthermore, on the bottom of the disc cartridge 70 at forward and rearward locations on the same side as the long guide groove 70b a circular opening 70e and a slightly elongate opening 70f are formed respectively. Also, a engaging portion 70g is formed below the long guide groove 70b at a location so as to engage an edge member 73a of the shutter 73. Projecting into the disc cartridge 70, a U-shaped lock lever 74 formed at an end of the edge member 73a of the shutter 73 is provided such that when the lock lever closes the long guide groove 70b, a locked condition of the disc cartridge 70 is established. Further, a spring (not shown) is provided so as to bias the shutter 73 in a closing direction.

According to the above described embodiment of a disc loading apparatus 1 according to the invention, the disc cartridge 70 is inserted into the cartridge holder 40 such that the projecting portion 42b of the side member 42 of the cartridge holder 40 is inserted into the long guide groove of the disc cartridge 70 such that the locked condition of the disc cartridge 70 is released. When the disc cartridge 70 is inserted into the cartridge holder 40, the hook portion 53 which projects from the side portion 52 of the loading slider 50 through the side member 42 of the cartridge holder 40, engages the engaging portion 70g of the disc cartridge 70. In this condition, the actuation lever 55a of the insertion completion detecting switch 55 is pressed by the side of the disc cartridge 70 so as to cause the insertion completion detecting switch 55 to assume an ON condition. The ejection completion detecting switch thus assumes an OFF condition and the loading motor 29 becomes ON. Only when the disc cartridge 70 is surely inserted into the cartridge holder 40 will the disc loading apparatus assumes an initial position as shown in FIG. 3 to beginning of a disc loading operation. The projecting portion 42b of the side member 42 of the disc holder 40 and the insertion completion detecting switch 55 mounted on the side portion 52 of the loading slider 50 collectively act to prevent misloading of the disc cartridge 70.

After insertion of the disc cartridge 70 into the cartridge holder 40 is completed, the loading motor 29 is turned on to activate the worm gear 30 associated therewith, and drive the speed reduction gears 25–28 so as to rotate the drive gear 24 in a clockwise direction. According to rotation of the drive gear 24, the eccentrically located drive pin 65, projected from the top of the drive gear 24 is moved in the rearward direction causing the swing plates 60 and 61 to be rotated also in the clockwise direction, as seen in FIG. 3, and, according to this, the loading slider 50 opposed to the cartridge holder 40 slides in the rearward direction. Upon rearward movement of the loading slider, the hook portion 53 thereof, which is engaged with the engaging portion 70g of the disc cartridge, pulls the disc cartridge 70 so as to position same over the turntable 3. According to this movement, the projecting portion 42b of the cartridge holder 40 is active to open the shutter 73 of the disc cartridge 70.

After completion of the pulling operation of the disc cartridge 70 by the loading slider 50, the upper toothed portion 24a of the drive gear 24 engages the rack 23 of the main slider 20. According to this, the main slider 20 slides in the rearward direction relative to the chassis 2 and the pins 43, 43 provided at each side of the cartridge holder 40 slide in the cam grooves 22a, 22a provided in each of the side portions 22, 22 of the main slider 20 so as to lower the cartridge holder in the direction of the turntable 3. In case of selection of a play mode of the magneto-optical disc 71 of the disc cartridge 70, as seen in FIG. 4, the actuation lever 36a of the first position detecting switch 36 contacts the first corner portion 22c of the main slider 20 to determine a first position for stopping sliding motion of the main slider 20. Alternatively, if a record mode of the magneto-optical disc is selected, as seen in FIG. 5, the rack 23 etc., are driven such that sliding motion of the main slider 20 in the rearward direction is continued further until the actuation lever 37a of the second position detecting switch 37 contacts the second corner portion 22d of the main slider. Then, as mentioned above, the cartridge holder 40 and the loading slider 50 are lowered by a predetermined distance (i.e. 3.2 mm). At this, the disc cartridge 70 supported by the cartridge holder 40 and the loading slider 50 is lowered toward the main slider 20 such that the head portions 18a, 18a of the positioning pins 18, 18 thereof are inserted into the circular positioning guide opening 70e and the elongate guide opening 70f of the disc cartridge 70 such that the disc cartridge 70 is securely and accurately positioned on the chassis 2 in the longitudinal and lateral directions (hereinbelow X and Y directions).

At this time, when loading operation of the disc cartridge is completed, and the disc cartridge 70 is securely held such that the magneto-optical disc 71 is without looseness or play in the radial direction thereof, engagement of the magneto-optical disc 71 of the disc cartridge 70 in either play or record operations is possible. Further, the rack 23 of the main slider 20 is moved slightly by the second swing plate 61 to assure firm engagement of the rack 23 with the upper toothed portion 24a of the drive gear 24 is maintained.

When the main slider 20 slider moves to the first position detecting switch 36 and stops in the play position (i.e. 5 mm from an initial position) the rack 23 is positioned as shown in FIGS. 4 and 6. At this time, the cam 31 at the lower side of the rack 23 moves the slide plate 35 to the position shown by the middle, solid line of FIG. 6. Thus the support arm 10 mounting the magnetic head 12 swings to a position such that the end portion thereof is adjacent the optical pickup 7. On the other hand, when the main slider 20 slider moves to the second position detecting switch 37 and stops in the record position (i.e. 7 mm from an initial position) the rack 23 is positioned such that the cam 31 at the lower side of the rack 23 moves the slide plate 35 to the position shown by the two-dot chain line of FIG. 6. According to this, the support arm 10 mounting the magnetic head 12 swings to a position such that the end portion thereof is more closely adjacent the optical pickup 7. In addition, a standby position of the support arm 10 of the optical pickup 7 is adopted when the swing plate 35 is moved to the position shown by the lower single-dot chain line of FIG. 6. It will further be noted that, in the play position of the loading apparatus 1 the optical pickup 7 is active and in the recording position thereof both the optical pickup 7 and the magnetic head 12 are active.

For eject operation of the disc cartridge 70, the loading motor 29 is driven in the opposite direction causing the cartridge holder 40 and the loading slider 50 to me moved oppositely to the motion described above. At this time, as best seen in FIG. 2, the loading slider 50 slides until the actuating lever 56a of the eject completion detecting switch 56 mounted thereon contacts the projecting portion 42e of the cartridge holder to place the eject completion detecting switch in an ON state, thus ejection of the disc cartridge 70 from the loading apparatus 1 is completed.

According to the above, since the hook portion 53 of the loading slider engages the engaging portion 70g of the disc cartridge 70 when the disc cartridge 70 is inserted into the cartridge holder 40 so as to pull the disc cartridge 70 back and forth according to movement of the loading slider 50, and because the main slider 20 slides so as to oppose the cartridge holder 40 and the loading slider 50 during loading and unloading operations, smooth, secure loading and unloading of the disc cartridge can be accomplished with a simple construction. Thus, the coil springs etc., for providing pulling force, as well as the lock and lock lever arrangements of conventional disc loading arrangements are not necessary. Further, according to the above described construction an overall width of the loading apparatus can be reduced and a base cost is also reduced. Thus, the arrangement according to the invention provides simple structure, smaller and thinner size and reliable operation all at once.

Figure 16:
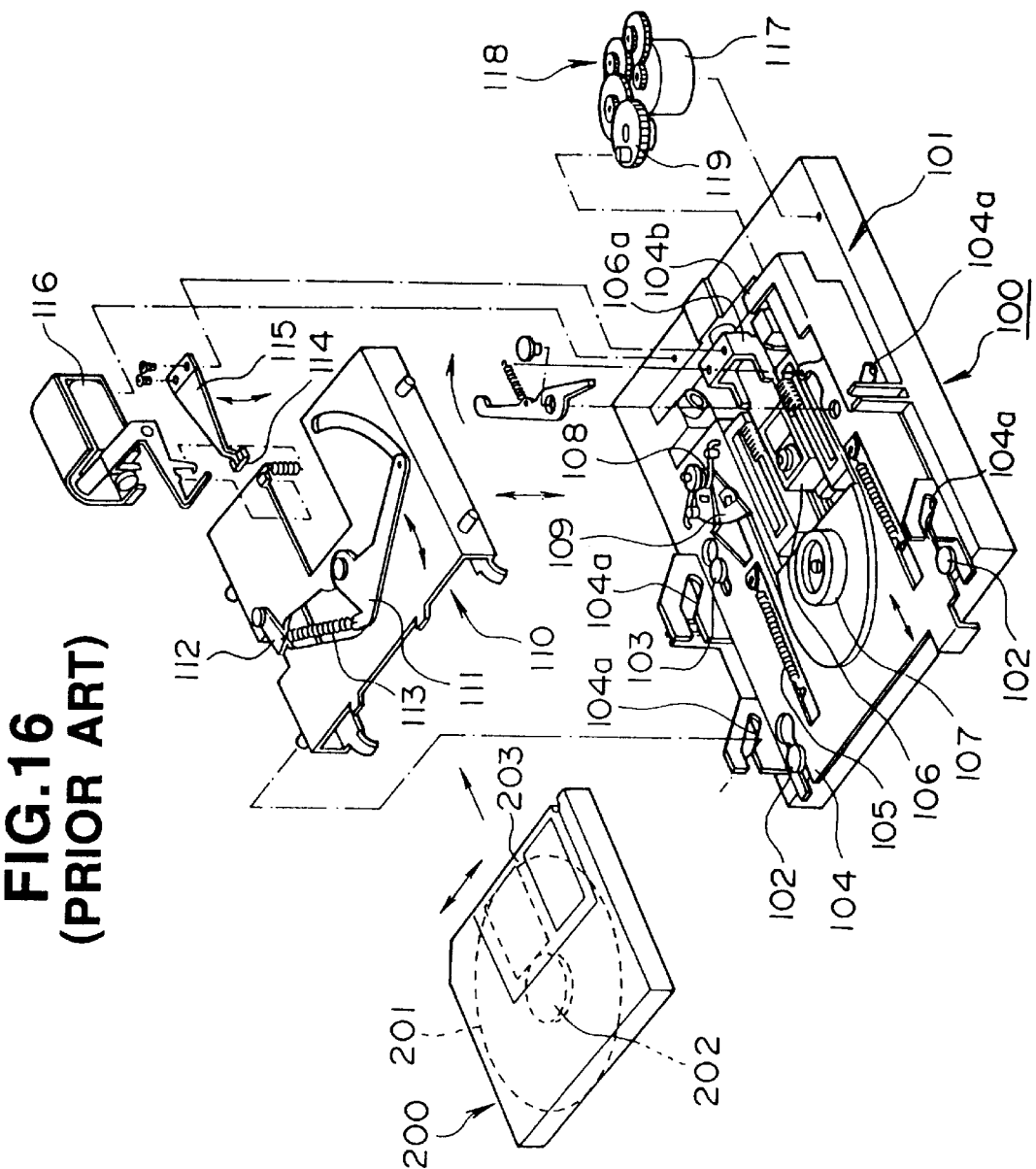
FIG. 16 is a perspective view of a conventional disc cartridge loading apparatus.

Also, the projecting portion 42b of the right side portion 42 serves to open and close the shutter 73 of the disc cartridge 70 simply and easily, according to loading and unloading movement of the loading slider 50. Therefore, a shutter opening and closing lever as employed in the prior art is not required further reducing both size and cost of the entire disc reproducing and/or recording apparatus 500 (see FIG. 16). Also, since the insertion completion detecting switch 55 is provided on the right side portion 52 of the loading slider rearwardly of the projecting portion 42b, the loading slider 50 is operative only when the disc cartridge has been completely and correctly inserted into the cartridge holder 40 and misloading of the disc cartridge is assuredly prevented. It will also be noted that the projecting portion 42e of the right side 42 of the cartridge holder 40 is associated with the eject completion detecting switch 56 mounted on the side portion 52 of the loading slider, smooth ejection of the disc cartridge 70 from the loading apparatus 1 is also assured.

Further, operation of the main slider 20 and the loading slider 50 are both controlled by a single motor 29, the rack 23 and the swing plates 60 and 61 making the driving source as small as possible and further contributing to lower costs, and miniaturization of the unit as a whole. Via the movement of the rack 23, the support arm 10 mounting the magnetic head 12 can be freely and easily switched between a standby position, a play position, and a record position, further reducing the number of parts, weight, costs etc., of the unit. Correct positioning for a selected one of the play and record positions is assured by the interaction of the position detecting switches 36 and 37 mounted on the chassis 2 with respective corner portions 22c and 22d of the side portion 22 of the main slider 20.

Thus according to the invention, a disc cartridge loading apparatus is provided which allows smooth loading and ejecting of disc cartridges with high reliability while featuring a simplified construction using a reduced number of parts, thus reducing costs and weight as well as size and complexity of a disc cartridge playing recording apparatus.

Hereinbelow, a second embodiment of a disc cartridge loading apparatus according to the invention will be described in detail with reference to FIGS. 7–16.

According to the second embodiment of a disc loading apparatus, during loading, the cartridge holder 40 is moved upward by sliding motion of the main slider 20, thus the cartridge holder is fixed in X and Y directions, namely the longitudinal and lateral directions, in relation to an outer casing of the disc reproducing and/or recording apparatus 500 (see FIG. 16), as described above in relation to the first embodiment. However, according to the second embodiment, the main slider 20 is also secured in the vertical direction (hereinbelow Z direction) with respect to the outer casing via a forked engaging member 122*f*. Thus the main slider, cartridge holder and disc cartridge are stably held in X, Y and Z directions, assuring accurate reading and/or writing of the disc cartridge and preventing dislodgment or erroneous operation of the disc cartridge due to motion, or external shock applied to the disc reproducing and/or recording apparatus 500.

A disc loading apparatus 100 according to the second embodiment includes a turntable 3 constituting the drive mechanism and mounted on a shaft 4 of a motor (not shown) at substantially a center area of a chassis 2. The chassis has a cut-out portion 2*b* of a substantially rectangular shape formed from the center of the chassis toward a right side portion 2*a*. Basically, the arrangement of the chassis 2, a main slider 20, a cartridge holder 40, a loading slider 50 are structurally similar the the arrangement of the above described first embodiment, for such similar structure, detailed description will be omitted and identical reference numbers will be used.

Figure 7:
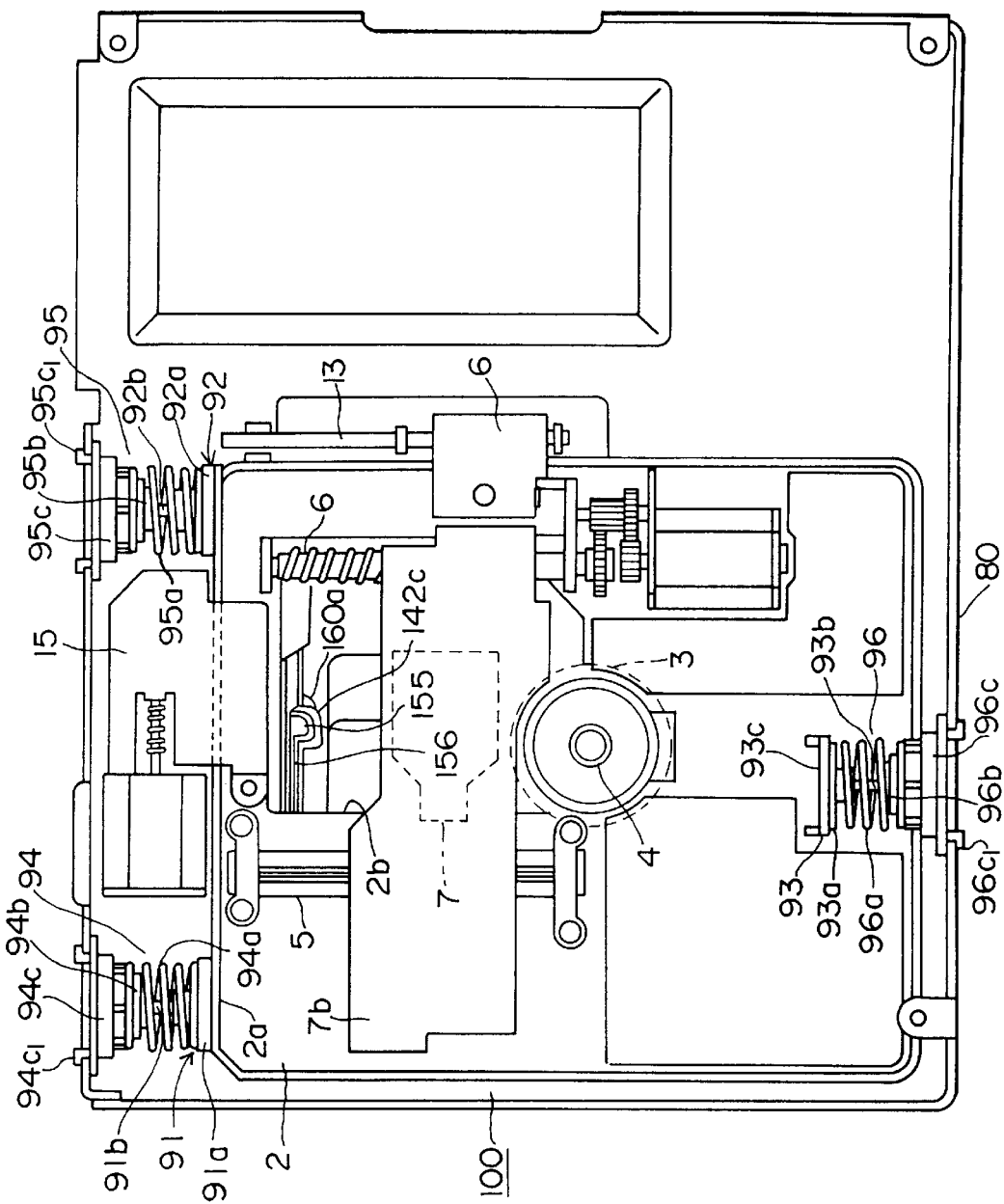
FIG. 7 is a bottom view of the disc loading apparatus of the second embodiment.

Referring now to FIGS. 8–15, according to the present embodiment, a right side portion 122*a* of the main slider 20 includes a horizontally disposed forked engaging piece 122*f*, as seen in FIG. 7. Further, a support piece 122*g* is horizontally disposed at a top rear portion of the right side portion 122*a* of the main slider 20. On the other hand, a support pin 122*h* is projected horizontally outward of the left side portion 122*b* of the main slider 20.

The loading apparatus of the second embodiment is also equipped with a rack 23 as shown in FIG. 6, by which the cartridge holder 40 may be selectively moved between a standby position, a play position and a record position identically to the first embodiment.

Further, according to the present embodiment, the forked engaging piece 122*f*, formed on the upper edge portion of the front end of the right side portion 122*a* of the main slider 20 engages a rotary support body 136 which is axially mounted on the chassis 2.

The rotary support body 136 is protrudingly formed on a shaft cylinder section 136*a* which surrounds a shaft pin 137, mounted on the chassis 2, on which the rotary support body 136 may rotate. The rotary support body 136 further includes a support arm portion 136*b* and and engaging arm portion 136*c* projected horizontally therefrom. The engaging arm portion 136*c* includes a protrusion 136*c*1 which engages a forked section 122*f*1 of the forked engaging piece 122*f*.

Figure 8:
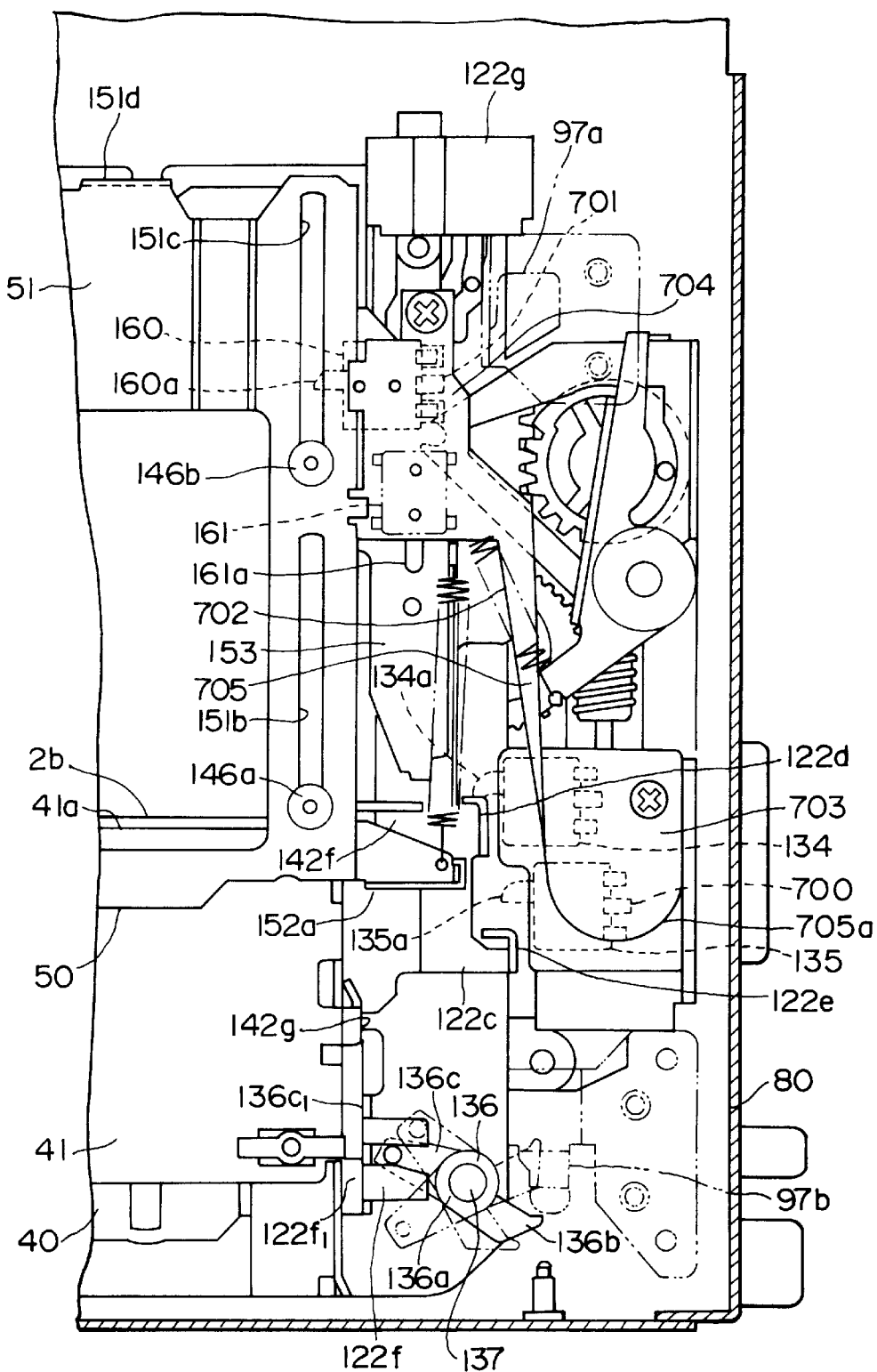
FIG. 8 in an enlarged plan view of a main portion of the disc loading apparatus of the second embodiment.
Figure 9:
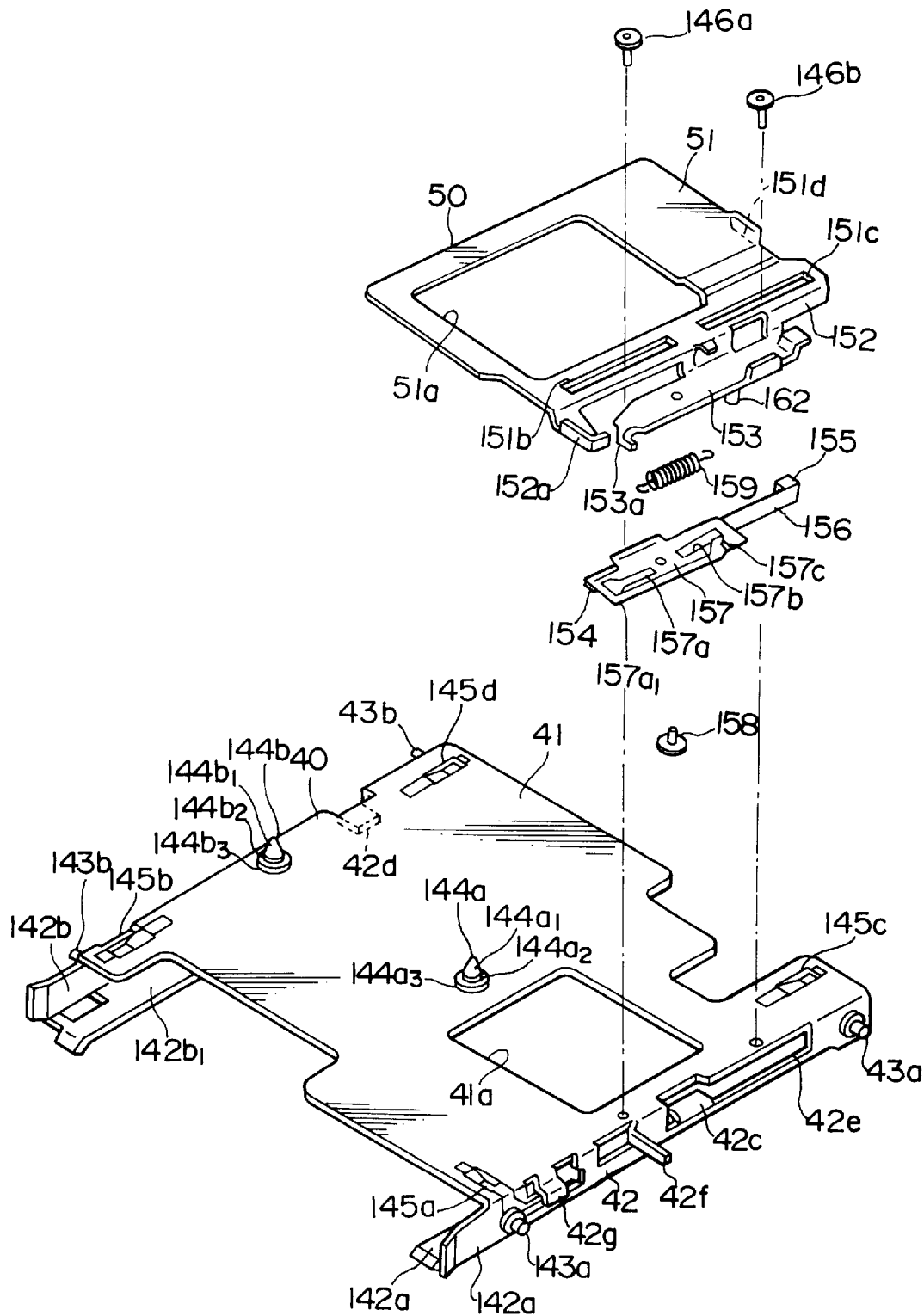
FIG. 9 is an exploded perspective view of the cartridge holder and the loading slider of the second embodiment.
Figure 10:
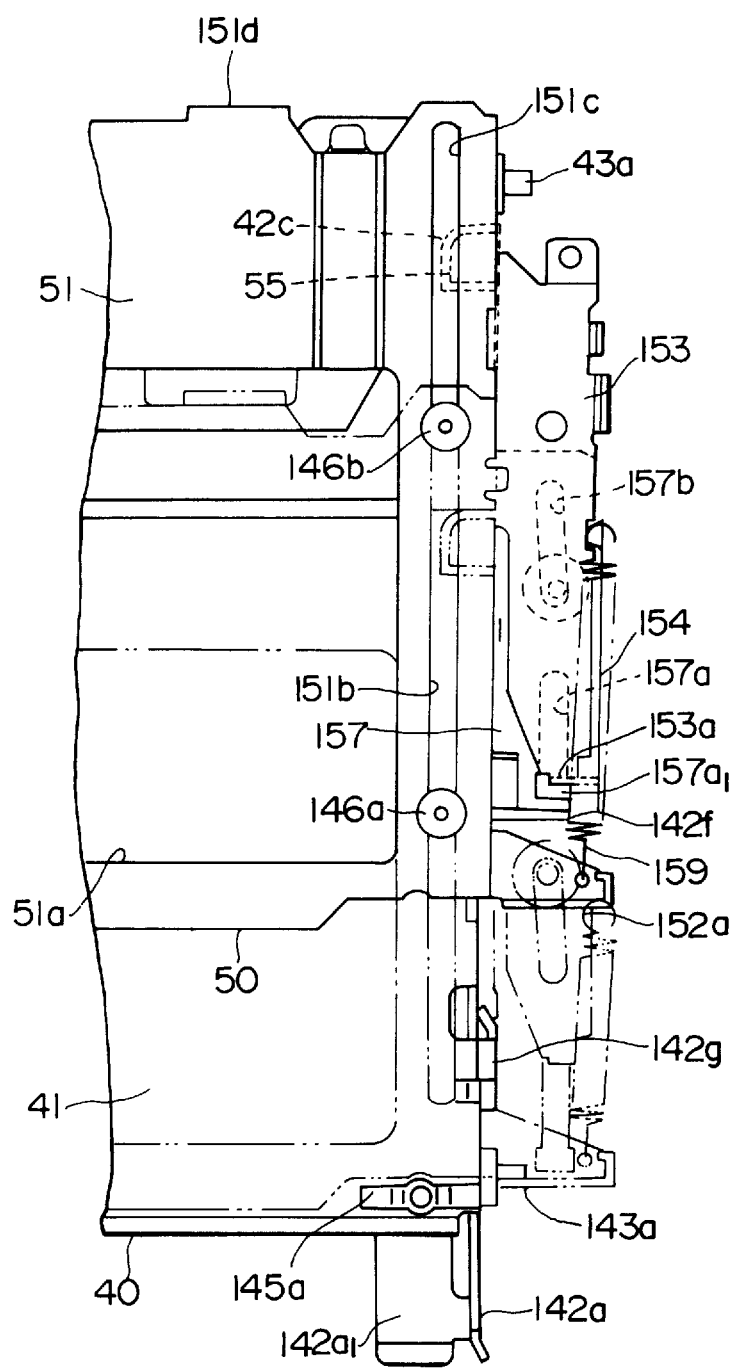
FIG. 10 is a plan view of a part of the assembly of the cartridge holder and the loading slider shown in FIG. 9.

The construction of the cartridge holder 40 and loading slider 50 of the present embodiment is substantially similar to that of the above-described first embodiment, as may be seen in FIGS. 8 and 9. However, referring to the drawing, according to the present embodiment, the plate member 41 of the cartridge holder is provided with a pair of conical positioning pins 144*a*, 144*b*, located to the left of a cut-out 141*a*, as seen in Figs. Top sections 144*a*1, 144*b*1 of the positioning pins 144*a*, 144*b*, are conical and supported on cylindrical portions 144*a*2, 144*b*2, while flange portions 144*a*3, 144*b*3 are formed below the cylindrical portions 144*a*2, 144*b*2 with a specified gap between the flange portions 144*a*3, 144*b*3 and the surface of the plate member 41 of the cartridge holder 40. Further provided at corner portion of the plate member 41 of the cartridge holder are holding springs 145*a*, 145*b*, 145*c*, 145*d* for securely retaining the disc cartridge 70, which may be of a plate spring type and integrally formed with the plate member 41.

As also seen in FIG. 9, the loading slider 50 is of metal plate and substantially corresponds to the loading slider of the first embodiment. It will be noted that the horizontal plate portion 51 of the loading slider 50 has a width corresponding to substantially the right-hand half section of the plate member 41 of the cartridge holder 40 and has a flat shape with a length shorter than the longitudinal size of the plate member 41. Further, the horizontal plate portion 51 of the loading slider 50 has a cut-out portion 51*a* corresponding to the cut-out portion 41*a* of the cartridge holder 40. The horizontal plate portion 51 of the loading slider of the second embodiment is also provided with guide grooves 51*a*, 51*a* extending in a front to rear orientation of the plate portion 51. The guide grooves 51*a*, 51*a* are engaged by the guide pins 146*a*, 146*b* which pass through the plate member 41 of the cartridge holder 40 to engage the guide grooves 151*b*, 151*c* of the cartridge holder 40 so as to be slidably movable relative thereto. At a rear side of the horizontal plate portion 51, a tab 151*d* is provided for engaging a forward edge of the disc cartridge 70 for limiting a degree of insertion thereof.

The loading slider 50 is also provided with a lock lever 154 attached to a horizontal side piece 153 thereof.

As seen in FIG. 9, the lock lever 154 is formed by bending a sliding surface 157 horizontally from the upper edge of the base end of a leaf spring 156 which is fixed at the tip thereof with an engaging claw 155, made of synthetic resin or the like, which is engageable with the engaging portion 70*g* of the disc cartridge 70. To the front side of the sliding surface 157 of the lock lever 154, a first elongate guide hole 157*a* having an engaging edge 157*a*1 is formed, while to the rear side of the sliding surface 157, a second elongate guide hole 157*b* is formed, the second elongate guide hole 157*b* has a slightly inclined orientation and a has a raised spring hook 157*c* formed at a side thereof substantially at the center of the second elongate guide hole 157*b*.

The lock lever 154 is installed slidably in the longitudinal direction on the bottom face of the horizontal side piece 153 of the loading slider 50 via an engaging pin 158 inserted through the elongated guide hole 157*b* such that an elongated guide hole 147*a* formed on the cartridge holder 40 is engaged by an engaging claw 153*a* which is formed by downward bending at the front of the horizontal piece 153. When the lock lever 154 slides rearwards, the engaging edge 157*a*1 of the first elongated guide hole 57*a* is engaged with the engaging claw 153*a*. The lock lever 154 stretches a tension coil spring 159 between the spring hook 157*c* and a protruding thrust piece 152*a* formed by horizontal bending at the front of the downwardly projecting side portion 52 of the loading slider 50 and the lock lever is energized to slide forward.

Thus, by having the lock lever 54 installed on the loading slider 50, the hook portion 155 at the tip of the leaf spring 156 protrudes toward the inside of the cartridge holder 40 from the right side 52 of the loading slider 50 and the inner edge of the slide surface 153 of the lock lever 154 makes contact with a strike member 142*g* which projects at the front of the right side member 42 of the cartridge holder when the loading slider 50 slides forward.

The above arrangement operates in conjunction with an insertion completion detecting switch 160 with an actuating lever 160*a* as disclosed hereinabove in connection with the first embodiment which is installed at the rear of a slide surface 153 of the loading slider 50 as shown in FIG. 8. In addition, an ejection completion detecting switch 161 with an actuating lever 161a is also provided. In addition, first and second swing plates having cam surfaces etc., are provided as in the above described first embodiment.

A first electric circuit 700 is provided connected to a side of positioning switches 134, 135 is installed on the sub-chassis 15 and a second electric circuit 701 is provided connected to a side of a disc insertion completion detection switch 160 and a ejection completion detection switch 161 installed on the slide surface 153 of the loading slider 50. The electric circuits are interconnected by means of a flexible wiring circuit board 702.

The flexible wiring circuit board 702 comprises a first circuit board 703, a second circuit board 704 and a connection wire section 705 having a narrow band-like configuration which connects the first and second circuit boards 703 and 704. The first circuit board 703 is attached to the side of the electric circuit 700 of the positioning switches 134, 135 and the second circuit board is attached to the electric circuit 701 of the detector switches 160, 161.

The connection wiring section 705 is fixed vertically on the circuit board 703 and is, in an initial state having a U-shaped slack portion 705a therein, is given a half turn of torsion on the side of the second circuit board 704 and arranged such that the U-shaped slack portion 705a is always biased downward.

Figure 12:
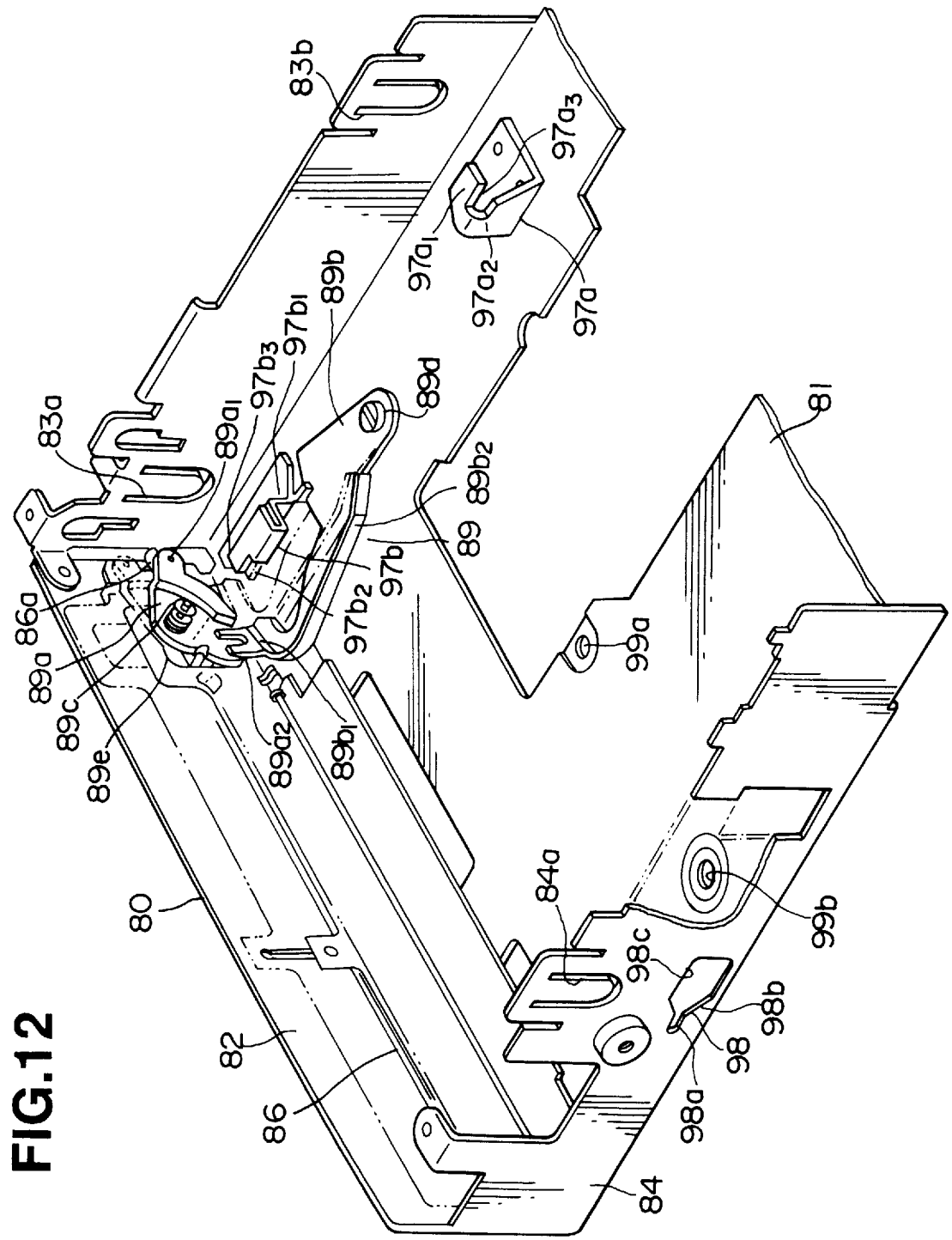
FIG. 12 is a cut-away perspective view of an inner portion of the sub chassis of FIG. 11.
Figure 13:
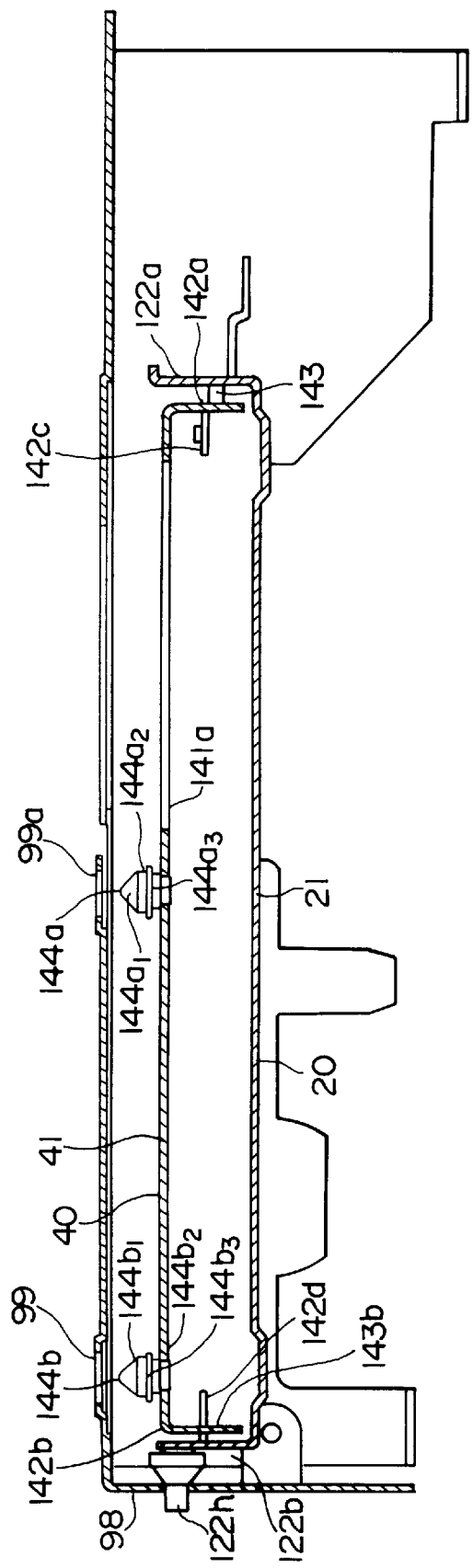
FIG. 13 is a cross-sectional view illustrative of the relationship of the main slider and the cartridge holder with respect to the sub chassis.

Referring now to FIGS. 12 and 13 an outer sub chassis 80 which supports the disc cartridge loading apparatus 1 of the second embodiment will by described in detail. The sub chassis 80 is formed in a rectangular, box shape having a top surface 81, front face 82 and side faces 83, 84. A disc cartridge insertion opening 85 is formed on the front face 81 and a shutter 86 is provided to open and close the insertion opening 85. An indicating plate 87, corresponding to the insertion opening 85 is further provided.

The shutter 86 performs actuation of an actuator mechanism 89 for opening and closing the shutter 86 in conjunction with sliding movement of the loading slider 50.

As best seen in FIG. 12, the actuator mechanism 86 is rotated on the vertical plane on the right side of inside of the front face 82 of the sub-chassis 80, and comprises a rotary member 89a which is engaged with the shutter 86 and an oscillating member 89b which is pivoted rotatably in the horizontal direction in the inner right side of the top surface 81 and rotates by being pressed by the protruding thrust piece 152a upon sliding movement of the loading slider 50.

The rotary member 89a is of substantially fan-shaped configuration and is pivoted on a shaft pin 89c at its center. It has an engaging pin 89a1 installed so as to protrude on one end side thereof and is engaged with a forked claw 86a formed on the right-hand end of the shutter 86. A linkage pin 89a2 is installed protruding from the other end and is engaged with a rising forked claw 89b1 at the front end of the oscillating member 89b. The oscillating member 89b is pivoted at the rear end by a screw pin 89d, and a raised contact edge 89b2 for contacting with the protruding thrust piece 152a of the loading slider 50.

The rotary member 89a is always biased in the closing direction of the shutter 86 by a coil spring 89e which is wound around the shaft pin 89c.

The disc cartridge loading apparatus 1 which is housed in the sub chassis 80 described above is supported via dampers 94, 95, 96 such that the loading apparatus 1 is capable of slight movement in the above-mentioned X, Y and Z directions with respect to the sub-chassis 80 so as to minimize influence of external vibrations on the loading apparatus 1.

Accordingly, the chassis 2 of the disc cartridge loading apparatus 1 of the second embodiment is provided with support members 91, 92 and 93 supporting the mechanism associated with the dampers 94, 95, 96. The support members 91, 92, 93 are provided at front and rear sides of the right side of the arrangement and at a lower center portion of the left side of the arrangement as seen in FIGS. 7 and 8. The right side support members 91 and 92 comprise projecting support rods 91b, 92b at the center of circular flanges 91a, 92a and attach the flanges 91a, 92a directly on the right side 2a of the chassis 2. The left side support member 93 comprises a circular flange 93a and a support rod 93b, similarly to the support members 91 and 92, however, the left side support member 93 is formed integrally with a leg piece 93c and is attached to the bottom of the chassis 2 at the center of the left side thereof via the leg piece 93c.

Thus, the disc cartridge loading apparatus 1 is supported by the sub chassis 80 via dampers 94, 95, and 96 which are in turn supported by the support members 91, 92, 93 as described above.

Dampers 94, 95, 96 comprise compression springs 94a, 95a, 96a, oil-filled elastic bodies 94b, 95b and 96b, made of rubber or the like, and fixed bases 94c, 95c and 96c which are linked with the compression springs 94a, 95a and 96a by inserting and fitting the elastic bodies 94b, 95b and 96b in the compression springs 94a, 95a and 96a.

The dampers 94, 95, 96 are arranged between the chassis 2 of the disc cartridge loading apparatus 1 and the sub chassis 80. Compression springs 94a, 95a and 96a engage with the flanges 91a, 92a and 93a of the support members 91, 92 and 93, and with the fixed bases 94c, 95c and 96c which have engaging claws 94c1, 95c1 and 96c1 which are formed on the outer end faces of the fixed bases 94c, 95c and 96c which engage with engaging holes 83a, 83b and 84a formed in right and left side faces of the sub-chassis 80.

According to the above, the disc cartridge loading apparatus 1 is oscillatably supported in X, Y and Z directions with respect to the sub-chassis 80.

Since two dampers 94 and 95 are installed on the right side and a single damper 96 is installed on the left side, the compression force of the damper 96 is determined to be higher than that of the dampers 94 and 95 by a degree so as to suitably balance the disc loading apparatus 1.

The sub-chassis is further provided with an engaging mechanism so as to fix the position of the disc cartridge loading apparatus during loading and unloading operations.

Figure 14:
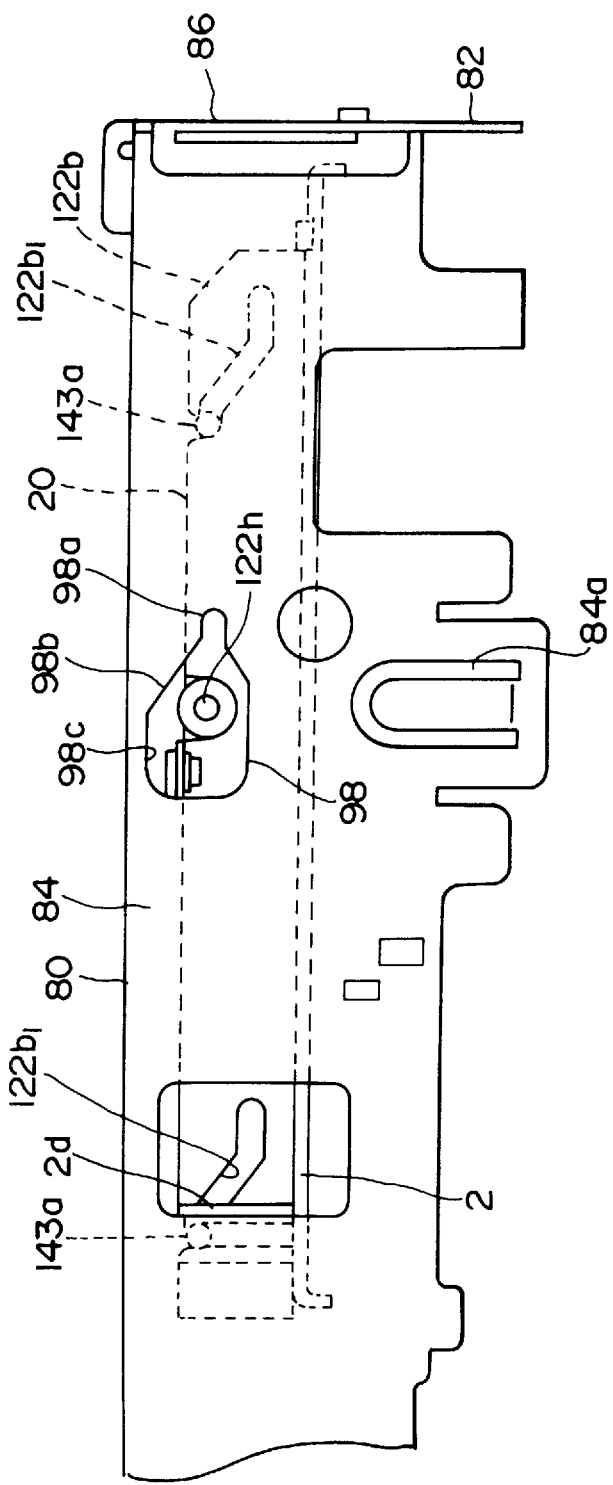
FIG. 14 is a left side view of the condition shown in FIG. 13.

Referring to FIGS. 13 and 14, the engaging mechanism is fixed on the right of the inner surface of the top face 81 of the sub-chassis 80 comprises an engaging support piece 97a wherein the support piece 122g of the right side 122a of the main slider 20 may be inserted and engaged. An engaging support piece 97b is provided with which the support arm piece 36b of the rotary support body 36 is engaged and, an engaging hole 98 is formed in the left side face 84 of the sub-chassis 80 wherein the support pin 122h projected horizontally from the central portion of the left side 122b of the main slider 20 is engaged and a pair of engaging holes 99a, 99b is provided on the top face 81 of the sub-chassis 80 wherein the pair of positioning pins 144a, 144b projected from the plate member 41 of the cartridge holder 40 are fittingly inserted.

As seen in FIG. 12, the engaging support piece 97a installed at the rear left side has a horizontal section 97a1 and a vertical section 97a2 and a slit 97a3 formed so as to partially divide the horizontal section 97a1 from the vertical section 97a2. The support piece 122g of the main slider 20 is inserted into the slit 97a3 so as to contact the horizontal section 97a1 while supported by the vertical section 97a2. The engaging support piece 97b at the front left side is provided with an engaging groove 97b1, guide pieces 97b2 and 97b3 which incline upward and downward and are formed respectively at the front end of the engaging support piece 97b1. The support arm 36b of the rotary support body 36 is guided by the guide pieces 97b2 and 97b3 to be inserted into the engaging groove 97b1 to be supported in the vertical direction.

As seen in FIG. 14, the engaging hole 98 is formed of an engaging groove 98a of which a front section thereof has a width nearly equal to or slightly larger than the diameter of the support pin 122h, a tapered guide section 98b which inclines from upper and lower sides toward the engaging groove 98a, and a wide hole 98c which continues rearward of the tapered guide section 98b such that the guide pin 122h of the main slider 20 may be moved from the wide hole 98c to be guided by the tapered guide section 98b to be engaged with the engaging groove 98a according to sliding movement of the main slider 20, to be securely supported.

Figure 11:
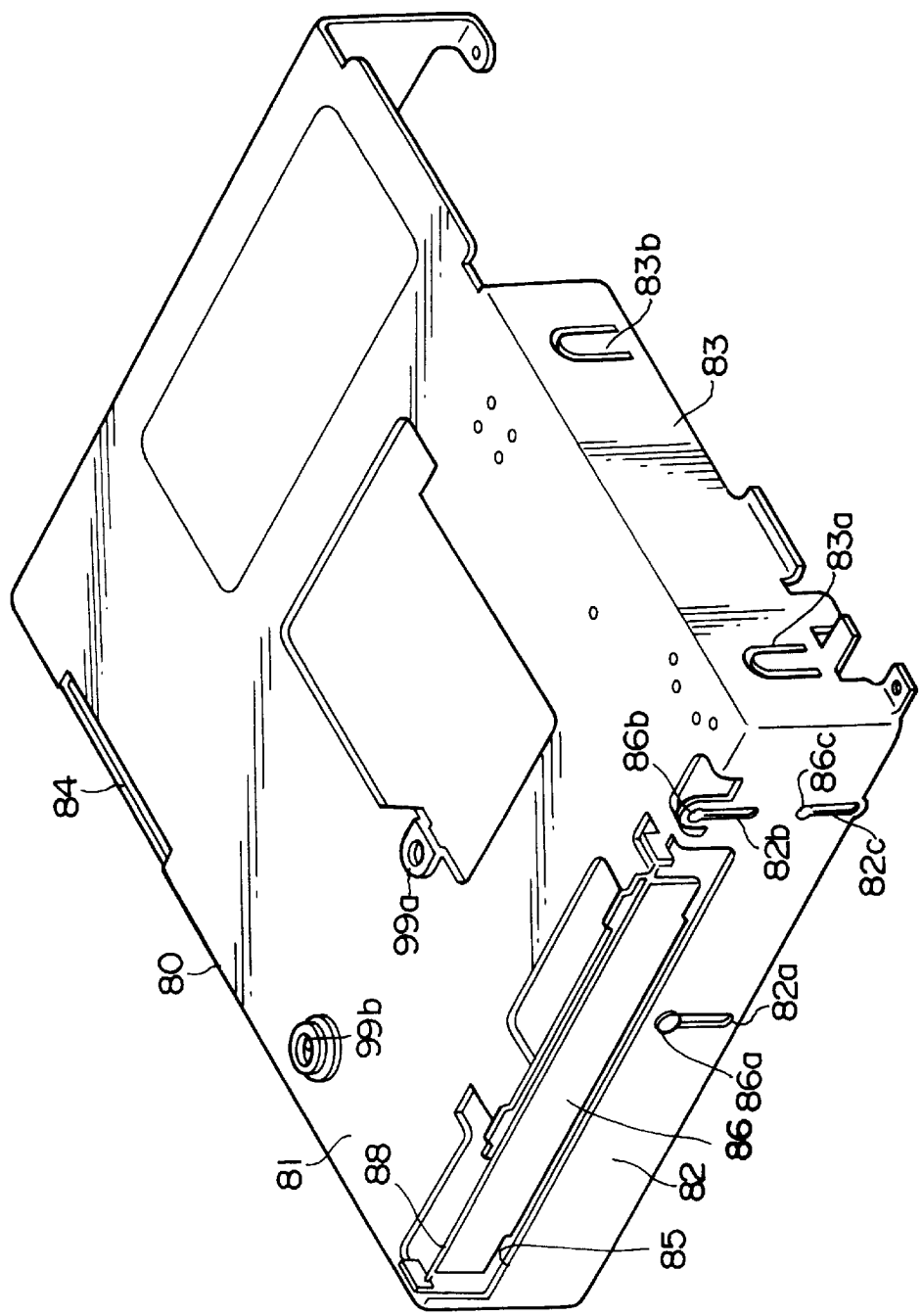
FIG. 11 is a perspective view of a sub chassis which houses and holds the disc cartridge loading apparatus of the second embodiment.

Referring to FIGS. 11 and 13, one side engaging hole 99a receiving the positioning pin 144a is formed as a true circle with a diameter equal to or slightly greater than the diameter of the cylindrical portion 144a2 of the positioning pin 144a. The other engaging hole 99b receiving the other positioning pin 144b is formed in an oval shape having a longitudinal diameter equal to or slightly greater than the diameter of the positioning pin 144b and having a large lateral diameter. Thus the positioning pin 144a is positioned and supported in the longitudinal and lateral directions while the other positioning pin 144b is supported in the longitudinal direction only.

Figure 15:
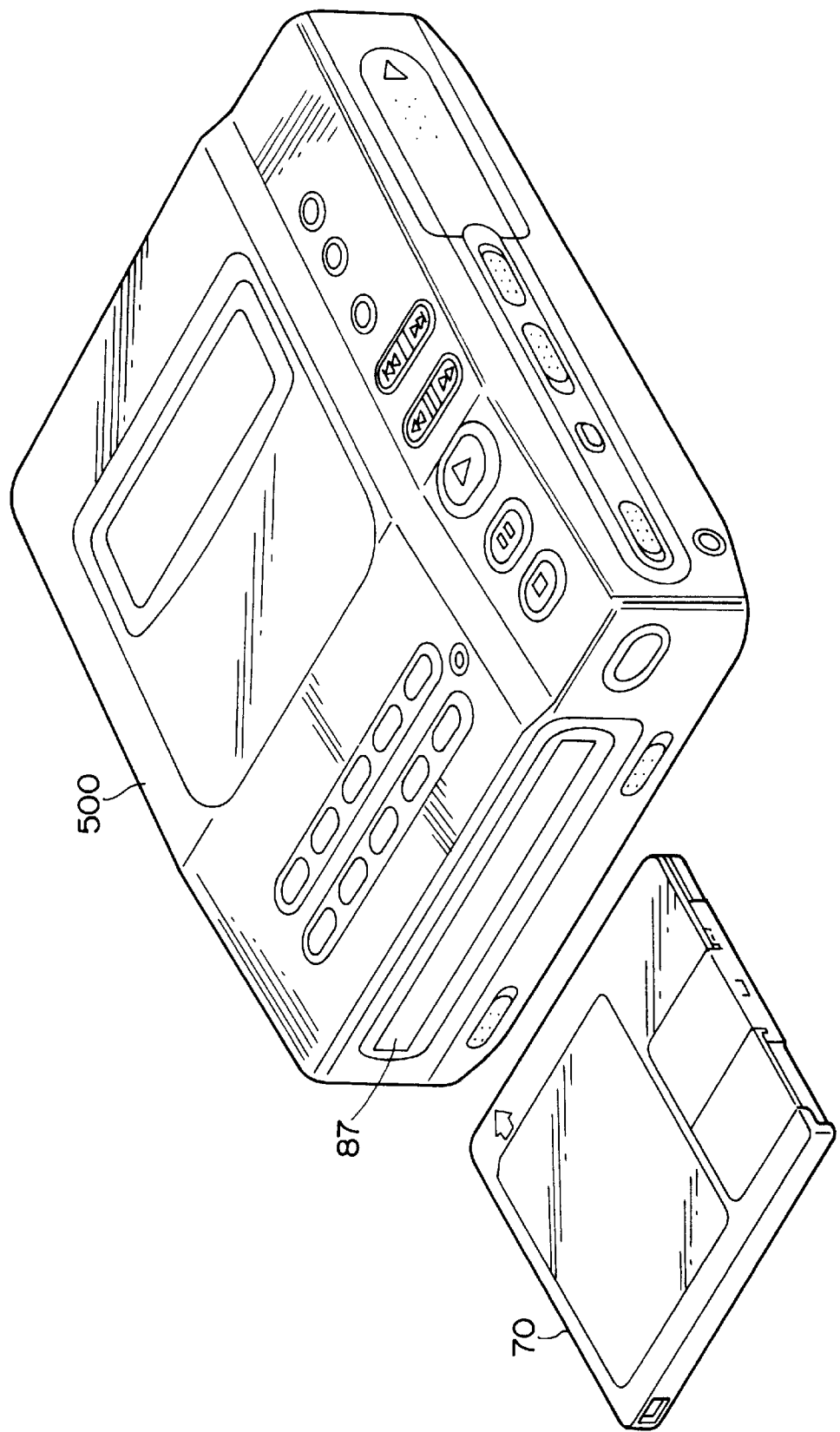
FIG. 15 is an external perspective view of a disc player equipped with a disc cartridge loading apparatus according to one of the first or second embodiments of the invention.

The above described disc cartridge loading apparatus as supported in the sub-chassis 80 may be housed in, for example, an disc reproducing and/or recording apparatus 500 as shown in FIG. 15.

When a disc cartridge 70 is loaded into the arrangement as described above, the head portions 18a, 18a of the positioning pins 18, 18 thereof are inserted into the circular positioning guide opening 70e and the elongate guide opening 70f of the disc cartridge 70 such that the disc cartridge 70 is securely and accurately positioned on the chassis 2 in the longitudinal and lateral directions according to the operation described previously in relation to the first preferred embodiment. However, according to the present embodiment, by forward movement of the main slider 20, the support piece 122g formed on the upper edge of the rear of the right side 122a of the main slider 20 is slidingly contacted with the horizontal section 97a1 and inserted into the slit 97a3 of the engaging support piece 97a which is fixed on the inner surface of the top face 81 of the sub-chassis 80. At the same time, the rotary support body 136 is rotated by the forked engaging piece 122f on the upper edge of the front side of the right side section 122a of the main slider 20 such that the support arm 136b is inserted into the engaging groove 97b1 of the engaging support piece 97b. In addition, the support pin 122h of the left-hand side section 122b of the main slider 20 is engaged in the engaging groove 98a of the engaging hole 98 and the main slider 20 is thus positioned and held in the vertical direction with respect to the sub-chassis 80, that is to say, the Z direction, in addition to the X and Y directions.

In this condition, the lock lever 154, supported by the right side horizontal piece 153 of the loading slider 50, slides forward by force of the tensile coil spring 159 and the hook portion 155 at the tip of the leaf spring 156 is moved to protrude through the right side 142a of the cartridge holder 40 at a position below the projection 42c thereof (see first embodiment).

As described above, in a state prior to loading, the main slider 20 and the cartridge holder 40 are positioned with respect to the sub-chassis 80 so that the whole of the disc cartridge loading apparatus 1 is supported in a positionally fixed state against the sub-chassis 80.

Because the loading slider 50 is moved forward under this condition, the strike piece 152a thereof presses the oscillating member 89b of the shutter actuator mechanism 89 on the sub-chassis 80 to cause the shutter actuator mechanism 89 to rotate. Thereby, the shutter 86 is pressed down via the rotary member 89a to open the opening 85, while the indicator plate 87 hangs down in front of the opened opening 85.

Thus, as with the above described first embodiment, since the hook portion 155 of the loading slider engages the engaging portion 70g of the disc cartridge 70 when the disc cartridge 70 is inserted into the cartridge holder 40 so as to pull the disc cartridge 70 back and forth according to movement of the loading slider 50, and because the main slider 20 slides so as to oppose the cartridge holder 40 and the loading slider 50 during loading and unloading operations, smooth, secure loading and unloading of the disc cartridge can be accomplished with a simple construction.

Also, the disc cartridge 70 supported by the cartridge holder 40 and the loading slider 50 is lowered toward the main slider 20 such that the head portions 18a, 18a of the positioning pins 18, 18 thereof are inserted into the circular positioning guide opening 70e and the elongate guide opening 70f of the disc cartridge 70 such that the disc cartridge 70 is securely and accurately positioned on the chassis 2 in the longitudinal and lateral directions (X and Y directions), and due the construction set forth above, is also secured in the vertical Z direction during cartridge loading and unloading. Thus according to the present embodiment, not only is the disc cartridge 70 securely positioned in the loading apparatus 1, but the loading apparatus 1 itself is securely positioned relative the sub-chassis 80 in X, Y and Z directions during loading and unloading and held oscillatably in X, Y, and Z directions during operation, thus minimizing influence of vibration of the disc reproducing and/or recording apparatus 500 or the sub-chassis 80 on the loading apparatus 1.

It will be noted that during loading and/or unloading operation, in case either of the insertion completion detecting switch 160 the ejection completion detecting switch 161 do not function properly, the motor 29 does not drive the loading slider 50 and the lock lever 154 does not depart from the strike section 142g of the cartridge holder 40 and therefore does not engage with the loading slider 50. Consequently, the lock lever 154 returns by force of the tensile coil spring 59 and thereby the disc cartridge 70 is pushed out of the cartridge holder 40 and misloading is prevented.

In the sequence of loading and unloading operations involving sliding movement of the main slider 20 and raising and lowering of the cartridge holder 40, by the sliding motion of the main slider 20, the supporting piece 122g is released from the slit 97a3 of the engaging support piece 97a of the sub-chassis 80 and the rotary support body 136 rotates thereby releasing the support arm piece 136b from the engaging groove 97b1 of the engaging support piece 97b. Further, the support piece 122h moves from the engaging groove 98a of the engaging hole 98 into the wide hole 98c thus freeing the chassis 2, which is connected with the main slider 20, in the vertical direction. That is to say, vertical positional fixing of the chassis 2 relative to the sub-chassis 80 is canceled.

Also, as the cartridge holder 40 is moved down, the positioning pins 144a and 144b on the plate member 41 of the cartridge holder 40 are released from the engaging holes 99a and 99b at the inner side of the top face 82 of the sub-chassis 80 so that the cartridge holder 40 (as well as the chassis 2) is released from the fixed positional state in the longitudinal and lateral directions.

By the above operation, the disc cartridge loading apparatus 1 as a whole becomes capable of oscillating in the vertical, lateral and longitudinal direction (X, Y, Z) with respect to the sub-chassis and transmission of vibration from the sub-chassis 80 to the disc cartridge loading apparatus 1.

Thus, according to the present invention, because the side cartridge loading apparatus 1 is oscillatably supported via the dampers 94, 95 and 96 with respect to the sub-chassis 80 at a time of recording or reproducing of data on the magneto-optical disc 71 of the disc cartridge 70 can be securely carried out without trouble since transmission of vibration from the disc reproducing and/or recording apparatus 500 or the sub-chassis 80 to the loading apparatus 1.

Also due to the X, Y and Z direction fixed positioning carried out during loading and unloading when the cartridge holder 40 is raised as described above, such that the position of the cartridge holder 40 exactly corresponds to the opening 85 of the sub-chassis 80, smooth loading and ejection of the disc cartridge 70 may be reliably accomplished.

Since one positioning member is provided for positioning the main slider 20 in the Z direction via the rotary body 136 pivotably mounted on the main slider 20, efficient use is made of limited space for carrying out the engaging and releasing of the disc cartridge loading apparatus 1 and all operations thereof may be reliably carried out.

According to the invention, a disc cartridge loading apparatus is provided which allows smooth loading and ejecting of disc cartridges with high reliability while featuring a simplified construction using a reduced number of parts, thus reducing costs and weight as well as size and complexity of a disc cartridge playing recording apparatus.

It will be noted that, although the above-described embodiments are drawn to a magneto-optical type cartridge apparatus, the present invention is not limited thereto, but may alternatively be employed for any other type of disc cartridge loading/unloading application.

It will further be noted that, while various configurations of the engaging members of the second embodiment have been disclosed, engagement may be accomplished by using a plurality of identical engaging members such as the arrangement of the support piece 122g for example, if space permits. Also, although coil springs and oil-filled elastic bodies have been described as the dampers 94, 95 and 96, alternatively, gas-filled air cushions, or rubber or metallic spring members alone may also be preferably employed.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A disc cartridge loading apparatus comprising:

an outer casing having a chassis mounted therein;

a main slider supported so as to be freely slidable on said chassis, the main slider having side members;

a cartridge holder which is supported so as to be freely moved upward and downward between the side members of said main slider, said cartridge holder being adapted to receive a disc cartridge between side portions thereof;

a loading slider which is supported so as to be freely slidable on said cartridge holder and having a hook portion on a side thereof engageable with an engaging groove provided on a corresponding side of said disc cartridge, the loading slider being slidably coupled to the cartridge holder for slidable movement in the forward and rearward directions relative to the cartridge holder;

drive means for selectively moving said disc cartridge inserted into said disc holder and engaged with said hook portion of said loading slider in a loading direction and an unloading direction according to sliding movement of said loading slider;

means for raising and lowering said cartridge holder and said loading slider relative to said main slider according to sliding movement of said main slider;

a plurality of damper mechanisms provided between said disc cartridge loading apparatus and said outer casing such that said loading apparatus is movable in three dimensions relative said outer casing;

engaging members engageable with corresponding engaging members on said outer casing so as to positionally fix said disc cartridge loading apparatus in said three dimensions during upward movement of said cartridge holder;

a projection is formed at an inner side of at least one side portion of said cartridge holder, the projection being adapted to displace a shutter of said disc cartridge according to loading or unloading of said disc cartridge into said disc cartridge loading apparatus; and a switch detecting completion of insertion of said disc cartridge and located rearwardly of said projection.

2. A disc cartridge loading apparatus as set forth in claim 1, wherein:

said cartridge holder includes an outer side;

said loading slider includes a side portion having an outer side;

said projection is formed at the outer side of said cartridge holder; and said switch is located on the outer side of the side portion of said loading slider so as to oppose said projection.

3. A disc cartridge loading apparatus comprising:

an outer casing having a chassis mounted therein;

a main slider supported so as to be freely slidable on said chassis, the main slider having side members;

a cartridge holder which is supported so as to be freely moved upward and downward between the side members of said main slider, said cartridge holder being adapted to receive a disc cartridge between side portions thereof;

a loading slider which is supported so as to be freely slidable on said cartridge holder and having a hook portion on a side thereof engageable with an engaging groove provided on a corresponding side of said disc cartridge, the loading slider being slidably coupled to the cartridge holder for slidable movement in the forward and rearward directions relative to the cartridge holder;

drive means for selectively moving said disc cartridge inserted into said disc holder and engaged with said hook portion of said loading slider in a loading direction and an unloading direction according to sliding movement of said loading slider;

means for raising and lowering said cartridge holder and said loading slider relative to said main slider according to sliding movement of said main slider;

a plurality of damper mechanisms provided between said disc cartridge loading apparatus and said outer casing such that said loading apparatus is movable in three dimensions relative said outer casing;

engaging members engageable with corresponding engaging members on said outer casing so as to positionally fix said disc cartridge loading apparatus in said three dimensions during upward movement of said cartridge holder;

a rack arranged on an outer side of said main slider;

a drive gear engaged to said rack and driven by said drive means, said loading slider being slid forward and backwards into and out of said cartridge holder via a pin mounted eccentrically on the drive gear;

whereby the disc cartridge engaged to said hook portion of said loading slider being selectively drawn in and ejected from said loading apparatus; and said cartridge holder and said loading slider being constructed so as to move vertically relative to said main slider by reciprocating sliding of said main slider in forward and rearward directions via rotation of said drive gear.

4. A disc cartridge loading apparatus as set forth in claim 3, further comprising:

a supporting arm having a magnetic head mounted thereto for recording data on a disc contained in said disc cartridge, said supporting arm being supported in a manner so as to be freely movable in a vertical direction with respect to said chassis and being engaged with a cam groove formed in the rack via a cam, said cam groove having three stepped portions corresponding to three vertical positions of said supporting arm, said three vertical positions including a standby position, in which the magnetic head is furthest from said disc, a reproducing position, in which said magnetic head is proximate said disc, and a recording position, in which said magnetic head is closely proximate said disc.

5. A disc cartridge loading apparatus as set forth in claim 4, further comprising: a pair of protruding portions arranged on an outer side of said main slider and spaced by a prescribed distance; and a pair of positioning switches arranged on a side portion of said chassis facing said pair of protruding portions to detect a reproducing position and a recording position of said main slider, respectively.

6. A disc cartridge loading apparatus comprising:

an outer casing having a chassis mounted therein;

a main slider supported so as to be freely slidable on said chassis, the main slider having side members;

a cartridge holder which is supported so as to be freely moved upward and downward between the side members of said main slider, said cartridge holder being adapted to receive a disc cartridge between side portions thereof;

a loading slider which is supported so as to be freely slidable on said cartridge holder and having a hook portion on a side thereof engageable with an engaging groove provided on a corresponding side of said disc cartridge, the loading slider being slidably coupled to the cartridge holder for slidable movement in the forward and rearward directions relative to the cartridge holder;

drive means for selectively moving said disc cartridge inserted into said disc holder and engaged with said hook portion of said loading slider in a loading direction and an unloading direction according to sliding movement of said loading slider;

means for raising and lowering said cartridge holder and said loading slider relative to said main slider according to sliding movement of said main slider;

a plurality of damper mechanisms provided between said disc cartridge loading apparatus and said outer casing such that said loading apparatus is movable in three dimensions relative said outer casing;

engaging members engageable with corresponding engaging members on said outer casing so as to positionally fix said disc cartridge loading apparatus in said three dimensions during upward movement of said cartridge holder; and a lock lever slidably and rotatably coupled to the loading slider and supporting said hook portion which engages with said engaging groove of said disc cartridge;

the loading slider being slidably mounted on the cartridge holder in the insertion direction of the disc cartridge to slide according to loading/eject action of the disc cartridge, wherein forward movement of the loading slider takes in the disc cartridge inserted in the cartridge holder and engaged by the hook portion, and return movement of the loading slider pushes out the disc cartridge to a specified position and sliding movement of the lock lever with respect to the loading slider pushes out the disc cartridge further.

7. A disc cartridge loading apparatus as set forth in claim 6, wherein: the hook portion is installed via a leaf spring.

8. A disc cartridge loading apparatus as set forth in claim 6, wherein: the lock lever is biased in an unloading direction with respect to the loading slider by a spring member, said lock lever being locked when said lock lever slides in a loading direction.

9. A disc cartridge loading apparatus as set forth in claim 6, wherein: the cartridge holder includes a release member configured to release locking by the lock lever of the loading slider.

10. A disc cartridge loading apparatus comprising:

an outer casing having a chassis mounted therein;

a main slider supported so as to be freely slidable on said chassis, the main slider having side members;

a cartridge holder which is supported so as to be freely moved upward and downward between the side members of said main slider, said cartridge holder being adapted to receive a disc cartridge between side portions thereof;

a loading slider which is supported so as to be freely slidable on said cartridge holder and having a hook portion on a side thereof engageable with an engaging groove provided on a corresponding side of said disc cartridge, the loading slider being slidably coupled to the cartridge holder for slidable movement in the forward and rearward directions relative to the cartridge holder;

drive means for selectively moving said disc cartridge inserted into said disc holder and engaged with said hook portion of said loading slider in a loading direction and an unloading direction according to sliding movement of said loading slider;

means for raising and lowering said cartridge holder and said loading slider relative to said main slider according to sliding movement of said main slider;

a plurality of damper mechanisms provided between said disc cartridge loading apparatus and said outer casing such that said loading apparatus is movable in three dimensions relative said outer casing;

engaging members engageable with corresponding engaging members on said outer casing so as to positionally fix said disc cartridge loading apparatus in said three dimensions during upward movement of said cartridge holder; and the engaging members for the cartridge holder include a plurality of shaft pins of conical shape the shaft pins being inserted in engaging holes formed in the outer casing for positioning the cartridge holder in two of said three directions with respect to said outer casing;

wherein at least one of said engaging members active for positioning said main slider relative to the outer casing is pivotally mounted and comprises a rotary support body which is rotated according to sliding motion of the main slider.

* * * * *